(12) United States Patent
Yu et al.

(10) Patent No.: US 11,997,638 B2
(45) Date of Patent: May 28, 2024

(54) POSITIONING METHOD AND DEVICE

(71) Applicant: HUAWEI TECHNOLOGIES CO., LTD., Shenzhen (CN)

(72) Inventors: Yingjie Yu, Shanghai (CN); Zhenyu Shi, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 406 days.

(21) Appl. No.: 17/238,497

(22) Filed: Apr. 23, 2021

(65) Prior Publication Data
US 2021/0266859 A1 Aug. 26, 2021

Related U.S. Application Data

(63) Continuation of application No. PCT/CN2019/113134, filed on Oct. 24, 2019.

(30) Foreign Application Priority Data

Oct. 31, 2018 (CN) .......................... 201811288735.3

(51) Int. Cl.
*H04W 64/00* (2009.01)
*G01S 5/04* (2006.01)
(Continued)

(52) U.S. Cl.
CPC ............... *H04W 64/00* (2013.01); *G01S 5/04* (2013.01); *H04B 17/27* (2015.01); *H04B 17/309* (2015.01)

(58) Field of Classification Search
CPC ........................... H04W 64/00; H04W 64/003
See application file for complete search history.

(56) References Cited

U.S. PATENT DOCUMENTS

| 10,080,098 | B1 | 9/2018 | Edge |
| 2015/0268326 | A1 | 9/2015 | Sung |

(Continued)

FOREIGN PATENT DOCUMENTS

| CN | 1416225 A | 5/2003 |
| CN | 101389118 A | 3/2009 |

(Continued)

OTHER PUBLICATIONS

3GPP TSG RAN WG1 82 Meeting, R1-154609, "QoS Handling in DL LBT Operation", Huawei, HiSilicon, Beijing, China, Aug. 2015; 5 pages.

(Continued)

*Primary Examiner* — Kevin Kim
(74) *Attorney, Agent, or Firm* — Maier & Maier, PLLC

(57) ABSTRACT

A positioning method and a device, related to the communications field. In a 5G NR system, UE may be positioned only by measuring an uplink angle of arrival. The method includes: obtaining, by a location management function network element, a positioning measurement parameter set, where the positioning measurement parameter set at least includes at least two uplink angles of arrival that are obtained by measuring a reference signal sent by a terminal device; and determining, by the location management function network element, a location of the terminal device based on the at least two uplink angles of arrival in the positioning measurement parameter set.

20 Claims, 14 Drawing Sheets

(51) Int. Cl.
    *H04B 17/27*     (2015.01)
    *H04B 17/309*     (2015.01)

(56) References Cited

U.S. PATENT DOCUMENTS

2016/0345286 A1   11/2016   Jamieson et al.
2018/0206144 A1*   7/2018   Jiang .................. G01S 5/02213

FOREIGN PATENT DOCUMENTS

| | | |
|---|---|---|
| CN | 102111204 A | 6/2011 |
| CN | 103096459 A | 5/2013 |
| CN | 104619018 A | 5/2015 |
| CN | 105209927 A | 12/2015 |
| CN | 106658540 A | 5/2017 |
| CN | 106851550 A | 6/2017 |
| CN | 107105498 A | 8/2017 |
| CN | 108023631 A | 5/2018 |
| CN | 108293172 A | 7/2018 |
| CN | 109327248 A | 2/2019 |
| EP | 3 337 195 A1 | 6/2018 |
| WO | 2017184865 A1 | 10/2017 |
| WO | 2017196510 A1 | 11/2017 |
| WO | 2018108097 A1 | 6/2018 |
| WO | 2018129337 A1 | 7/2018 |
| WO | 2018/163440 A1 | 9/2018 |

OTHER PUBLICATIONS

3GPP TSG RAN WG1 Meeting #94, R1-1809348, "Considerations on NR Positioning", Huawei, HiSilicon, Gothenburg, Sweden, Aug. 2018; 9 pages.

3GPP TS 36.305 V15.1.0, "3rd Generation Partnership Project;Technical Specification Group Radio Access Network; Evolved Universal Terrestrial Radio Access Network (E-UTRAN); Stage 2 functional specification of User Equipment (UE) positioning in E-UTRAN (Release 15)", Sep. 2018; 87 pages.

3GPP TS 36.331 V15.0.0, "3rd Generation Partnership Project; Technical Specification Group Radio Access Network; Evolved Universal Terrestrial Radio Access (E-UTRA); Radio Resource Control (RRC); Protocol specification (Release 15)", Dec. 2017; 776 pages.

3GPP TS 36.455 V15.0.0, "3rd Generation Partnership Project; Technical Specification Group Radio Access Network; Evolved Universal Terrestrial Radio Access (E-Utra); LTE Positioning Protocol A (LPPa) (Release 15)", Jun. 2018; 33 pages.

3GPP TS 36.459 V15.0.0, 3rd Generation Partnership Project; Technical Specification Group Radio Access Network; Evolved Universal Terrestrial Radio Access Network (E-UTRAN); SLm interface Application Protocol (SLmAP) (Release 15), Jun. 2018; 47 pages.

3GPP TS 38.305 V15.0.0, "3rd Generation Partnership Project; Technical Specification Group Radio Access Network; NG Radio Access Network (NG-RAN); Stage 2 functional specification of User Equipment (UE) positioning in NG-RAN (Release 15)", Jun. 2018; 57 pages.

3GPP TS 38.455 V15.1.0, "3rd Generation Partnership Project; Technical Specification Group Radio Access Network; NG-RAN; NR Positioning Protocol A (NRPPa) (Release 15)", Sep. 2018; 60 pages.

3GPP TSG RAN WG1 Meeting #94bis, R1-1810152, "Details of NR positioning techniques", Huawei, HiSilicon, Chengdu, China, Oct. 2018; 11 pages.

* cited by examiner

POSITIONING METHOD AND DEVICE

CROSS-REFERENCE TO RELATED APPLICATIONS

This application is a continuation of International Application No. PCT/CN2019/113134, filed on Oct. 24, 2019, which claims priority to Chinese Patent Application No. 201811288735.3, filed on Oct. 31, 2018. The disclosures of the aforementioned applications are hereby incorporated by reference in their entireties.

TECHNICAL FIELD

Embodiments relate to the communications field, and in particular, to a positioning method and a device.

BACKGROUND

In a long term evolution (LTE) system, user equipment (UE) may be positioned by measuring an uplink time difference of arrival (UTDOA) of the UE. A procedure of positioning the UE by measuring the UTDOA is defined in a protocol (36.305 8.5.3) and includes: an evolved serving mobile location center (E-SMLC) sends a location request to an evolved NodeB (eNB), and the eNB configures a sounding reference signal (SRS) resource of the UE after receiving the location request. The UE may broadcast an SRS by using the SRS resource. A location measurement unit (LMU) may measure the SRS broadcast by the UE and return a measurement result to the E-SMLC. The E-SMLC calculates a time difference of arrival, at each LMU, of the SRS broadcast by the UE, and then positions the UE based on a calculation result.

In a fifth-generation (5G) communications new radio (NR) system, network elements and an interface between the network elements change, and the procedure is no longer applicable to the 5G NR system. In addition, in a conventional technology, only the procedure of positioning the UE by measuring the UTDOA is provided, and high-precision positioning in the 5G system is also considered to be implemented by using another method.

SUMMARY

Embodiments provide a positioning method and a device. In a 5G NR system, UE may be positioned only by measuring an uplink angle of arrival (UAOA).

To achieve the foregoing objectives, the following solutions are used in the embodiments.

According to a first aspect, a positioning method is provided. The method includes: a location management function network element may obtain a positioning measurement parameter set, where the positioning measurement parameter set includes at least two uplink angles of arrival that are obtained by measuring a reference signal sent by a terminal device; and the location management function network element determines a location of the terminal device based on the at least two uplink angles of arrival in the positioning measurement parameter set.

An embodiment provides a positioning method applied to a 5G NR system. The at least two uplink angles of arrival may be obtained by measuring the reference signal sent by the terminal device twice, so that the terminal device can be positioned based on two of the obtained uplink angles of arrival. It can be understood that the method provided in this embodiment can be applied to the 5G NR system to position UE. Different from the conventional technology, the UE can be positioned only by measuring the uplink angle of arrival without measuring another parameter, for example, an uplink timing advance (TA).

With reference to the first aspect, in a first possible implementation of the first aspect, the method provided in this embodiment further includes: the location management function network element sends a measurement request message to a network element in a positioning measurement network element set, to indicate the network element in the positioning measurement network element set to measure the reference signal sent by the terminal device, to obtain the positioning measurement parameter set, where the terminal device sends the reference signal on a predetermined uplink resource.

In this embodiment, the location management function network element may indicate the same network element in the positioning measurement network element set to measure a plurality of different reference signals sent by the terminal device. The network element may obtain a plurality of uplink angles of arrival through measurement, and feed back, to the location management function network element, the plurality of uplink angles of arrival obtained through measurement, and the location management function network element obtains the positioning measurement parameter set. In this way, signaling overheads can be reduced, and the terminal device can be positioned. In addition, the location management function network element may indicate a plurality of network elements in the positioning measurement network element set to measure the same reference signal sent by the terminal device. Each network element that performs measurement can obtain one UAOA through measurement, and feeds back, to the location management function network element, the UAOA obtained through measurement by the network element, and the location management function network element may obtain the positioning measurement parameter set by obtaining the uplink angles of arrival fed back by the network elements. Positioning the terminal device by using reference signal measurement results of different network elements helps obtain a more accurate positioning result. It should be noted that the predetermined uplink resource may be one uplink resource, and the plurality of network elements in the positioning measurement network element set may receive a reference signal carried on the uplink resource. Alternatively, the predetermined uplink resources may be a plurality of different uplink resources that respectively correspond to one network element in the positioning measurement network element set. The plurality of network elements in the positioning measurement network element set may respectively receive, on different uplink resources, the different reference signals sent by the terminal device.

With reference to the first aspect or the first possible implementation of the first aspect, in a second possible implementation of the first aspect, the obtaining, by a location management function network element, a positioning measurement parameter set includes: receiving, by the location management function network element, the at least two uplink angles of arrival that are obtained through measurement by at least two network elements in the positioning measurement network element set; or receiving, by the location management function network element, the at least two uplink angles of arrival that are obtained through measurement by one network element in the positioning measurement network element set.

In this embodiment, each of a plurality of network elements in the positioning measurement network element set may measure a same reference signal sent by the terminal device, and feed back, to the location management function network element, an UAOA that is obtained through measurement by the network element. Alternatively, one network element in the positioning measurement network element set may measure a plurality of different reference signals sent by the terminal device. The network element may obtain a plurality of uplink angles of arrival, and feed back the plurality of obtained uplink angles of arrival to the location management function network element.

With reference to the first aspect or the first or the second possible implementation of the first aspect, in a third possible implementation of the first aspect, before the sending, by the location management function network element, a measurement request message to a network element in a positioning measurement network element set, the method further includes: sending, by the location management function network element, a location information request to each network element in the positioning measurement network element set, where the location information request is used to indicate, to the network element in the positioning measurement network element set, an uplink transmission resource that is of the reference signal and that is allocated to the terminal device. It should be noted that, if the location management function network element indicates, by using the measurement request message, one network element in the positioning measurement network element set to perform measurement, the uplink resource allocated to the terminal device herein is a plurality of different uplink resources. The terminal device may send reference signals on the plurality of different uplink resources, and the network element may measure a plurality of different reference signals sent by the terminal device, to obtain a plurality of uplink angles of arrival. It should be noted that, if the location management function network element indicates, by using the measurement request message, a plurality of network elements in the positioning measurement network element set to perform measurement, the uplink resource allocated to the terminal device herein is one uplink resource. The terminal device may send a reference signal on the uplink resource, and each of the plurality of network elements may measure the same reference signal sent by the terminal device, to obtain one UAOA.

In this embodiment, if the network element measuring the reference signal is a serving base station of the terminal device, the location management function network element may trigger, by using a location information request, a first network element to allocate, to the terminal device, the uplink resource for sending the reference signal, so that another network element (for example, a base station) measures the reference signal sent by the terminal device to obtain an UAOA. If the network element measuring the reference signal is not a serving base station of the terminal device, the location management function network element may notify, by using a location information request, the network element of the uplink resource used by the terminal device to send the uplink reference signal, so that the network element receives the reference signal on the corresponding uplink resource, and measures the UAOA of the reference signal.

With reference to the first possible implementation of the first aspect, in a fourth possible implementation of the first aspect, the sending, by the location management function network element, a measurement request message to a network element in a positioning measurement network element set, to indicate the network element in the positioning measurement network element set to measure the reference signal sent by the terminal device, to obtain the positioning measurement parameter set includes: sending, by the location management function network element, a NR positioning protocol annex message to an access management network element, where the NR positioning protocol annex message is used to indicate the access management network element to send the measurement request message to the network element in the positioning measurement network element set.

If the access management network element exists in a network, signaling exchange between the location management function network element and the network element in the positioning measurement network element set may be implemented by forwarding of the access management network element. The NR positioning protocol annex message sent by the location management function network element to the access management network element may carry reference signal configuration information and an UAOA measurement request. The access management network element may add the reference signal configuration information and the UAOA measurement request to a measurement request message and send the measurement request message to a network element that performs measurement.

With reference to any one of the first aspect or the first to the fourth possible implementations of the first aspect, in a fifth possible implementation of the first aspect, the location management function network element receives the NR positioning protocol annex message from the access management network element, where the NR positioning protocol annex message includes the positioning measurement parameter set, and the access management network element receives the positioning measurement parameter set from the network element in the positioning measurement network element set.

If the access management network element exists in a network, signaling exchange between the location management function network element and the network element in the positioning measurement network element set may be implemented by forwarding of the access management network element. Therefore, the network element performing measurement may transfer, to the access management network element by using the NR positioning protocol annex message, a measurement result (for example, an UAOA) obtained by measuring the reference signal sent by the terminal device, and then the access management network element forwards the received measurement result to the location management function network element by using the NR positioning protocol annex message. It should be noted that, if the location management function network element indicates one network element in the positioning measurement network element set to measure the reference signal sent by the terminal device, the measurement result fed back by the network element is the positioning measurement parameter set obtained in this embodiment. If the location management function network element indicates a plurality of network elements in the positioning measurement network element set to measure the reference signal sent by the terminal device, the location management function network element obtains the positioning measurement parameter set after the plurality of network elements separately feed back the measurement result to the location management function network element. In other words, the measurement results of the plurality of network elements form the positioning measurement parameter set obtained in this embodiment.

With reference to any one of the first aspect or the first to the fifth possible implementations of the first aspect, in a sixth possible implementation of the first aspect, the measurement request message includes a measurement parameter of the UAOA, and the measurement parameter is used to indicate that the UAOA is a first plane angle and/or a second plane angle; and the first plane angle is a plane angle on a first plane, the second plane angle is a plane angle on a second plane, and the first plane is perpendicular to the second plane.

In this embodiment, the terminal device may be positioned in a direction on a plane, or the terminal device may be positioned in a direction in space.

With reference to any one of the first aspect or the first to the sixth possible implementations of the first aspect, in a seventh possible implementation of the first aspect, the UAOA includes any one of the following angles: an UAOA determined by measuring a strongest path of the reference signal sent by the terminal device, and an UAOA determined by measuring a line-of-sight path of the reference signal sent by the terminal device.

In this embodiment, a plurality of propagation paths of the reference signal may be measured to obtain the UAOA of the reference signal. This is not limited in this embodiment.

With reference to any one of the first aspect or the first to the seventh possible implementations of the first aspect, in an eighth possible implementation of the first aspect, the positioning measurement parameter set further includes reference signal quality or a measured quality value obtained by measuring the reference signal sent by the terminal device, where the measured quality value is used to indicate reliability of the UAOA obtained by measuring the reference signal sent by the terminal device.

In this embodiment, the network element that performs measurement in the positioning measurement network element set may further measure the reference signal to obtain reference signal quality, and feed back, to the location management function network element, the reference signal quality obtained through measurement, and the location management function network element may evaluate, based on the reference signal quality that is obtained through measurement and reported by the network element, whether the UAOA reported by the network element is reliable. The network element may also directly report the measured quality value to the location management function network element, and the location management function network element may directly determine, based on the measured quality value, whether the UAOA reported by the network element is reliable.

With reference to any one of the first aspect or the first to the eighth possible implementations of the first aspect, in a ninth possible implementation of the first aspect, the positioning measurement parameter set is carried in a NR positioning protocol annex or an F1 application protocol.

It should be noted that, in a 5G system, a base station may include a centralized unit (CU) and a distributed unit (DU). The F1 application protocol is a protocol for transmission between the CU and the DU.

According to a second aspect, a positioning method is provided. The method includes: receiving, by a first network element, a measurement request message sent by a location management function network element, where the measurement request message is used to indicate the first network element to measure a reference signal sent by a terminal device, to obtain a positioning measurement parameter set, the positioning measurement parameter set includes at least two uplink angles of arrival, and the first network element belongs to a positioning measurement network element set; and sending, by the first network element, the positioning measurement parameter set to the location management function network element.

This embodiment provides a positioning method applied to a 5G NR system. A network element in the positioning measurement network element set may obtain a plurality of uplink angles of arrival by measuring the reference signal sent by the terminal device for a plurality of times, and then may position the terminal device based on the at least two uplink angles of arrival. It can be understood that the method provided in this embodiment can be applied to the 5G NR system to position UE. Different from the conventional technology, the UE can be positioned only by measuring the UAOA without measuring another parameter, for example, an uplink timing advance (TA).

With reference to the second aspect, in a first possible implementation of the second aspect, the receiving, by a first network element, a measurement request message sent by a location management function network element includes: receiving the measurement request message sent by an access management network element, where the measurement request message is sent after the access management network element receives a NR positioning protocol annex message sent by the location management function network element, and the NR positioning protocol annex message is used to indicate the access management network element to send the measurement request message to the first network element.

With reference to the first possible implementation of the second aspect, in a second possible implementation of the second aspect, the sending, by the first network element, the positioning measurement parameter set to the location management function network element includes: sending, by the first network element, the NR positioning protocol annex message to the access management network element, where the NR positioning protocol annex message includes the positioning measurement parameter set, to help the access management network element send the positioning measurement parameter set to the location management function network element.

With reference to any one of the second aspect or the first or the second possible implementation of the second aspect, in a third possible implementation of the second aspect, the measurement request message includes a measurement parameter of the UAOA, and the measurement parameter is used to indicate that the UAOA is a first plane angle and/or a second plane angle; and the first plane angle is a plane angle on a first plane, the second plane angle is a plane angle on a second plane, and the first plane is perpendicular to the second plane.

With reference to any one of the second aspect or the first to the third possible implementations of the second aspect, in a fourth possible implementation of the second aspect, the UAOA includes any one of the following angles: an UAOA determined by measuring a strongest path of the reference signal sent by the terminal device, and an UAOA determined by measuring a line-of-sight path of the reference signal sent by the terminal device.

With reference to any one of the second aspect or the first to the fourth possible implementations of the second aspect, in a fifth possible implementation of the second aspect, the positioning measurement parameter set further includes reference signal quality or a measured quality value obtained by measuring the reference signal sent by the terminal device, where the measured quality value is used to indicate reliability of the UAOA obtained by measuring the reference signal sent by the terminal device.

According to a third aspect, a network device is provided. The network device includes: an obtaining unit, configured to obtain a positioning measurement parameter set, where the positioning measurement parameter set at least includes at least two uplink angles of arrival that are obtained by measuring a reference signal sent by a terminal device; and a positioning unit, configured to determine a location of the terminal device based on the at least two uplink angles of arrival in the positioning measurement parameter set.

With reference to the third aspect, in a first possible implementation of the third aspect, the network device further includes a sending unit, where the sending unit is configured to send a measurement request message to a network element in a positioning measurement network element set, to indicate the network element in the positioning measurement network element set to measure the reference signal sent by the terminal device, to obtain the positioning measurement parameter set, where the terminal device sends the reference signal on a predetermined uplink resource.

With reference to the third aspect or the first possible implementation of the third aspect, in a second possible implementation of the third aspect, the obtaining unit is configured to: receive the at least two uplink angles of arrival that are obtained through measurement by at least two network elements in the positioning measurement network element set; or receive the at least two uplink angles of arrival that are obtained through measurement by one network element in the positioning measurement network element set.

With reference to the third aspect or the first or the second possible implementation of the third aspect, in a third possible implementation of the third aspect, the sending unit is further configured to: before sending the measurement request message to the network element in the positioning measurement network element set, send a location information request to each network element in the positioning measurement network element set, where the location information request is used to indicate, to the network element in the positioning measurement network element set, an uplink transmission resource that is of the reference signal and that is allocated to the terminal device.

With reference to the first possible implementation of the third aspect, in a fourth possible implementation of the third aspect, the sending unit is configured to send a NR positioning protocol annex message to an access management network element, where the NR positioning protocol annex message is used to indicate the access management network element to send the measurement request message to the network element in the positioning measurement network element set.

With reference to the third aspect or the first to the fourth possible implementations of the third aspect, in a fifth possible implementation of the third aspect, the obtaining unit is configured to receive the NR positioning protocol annex message from the access management network element, where the NR positioning protocol annex message includes the positioning measurement parameter set, and the access management network element receives the positioning measurement parameter set from the network element in the positioning measurement network element set.

With reference to any one of the third aspect or the first to the fifth possible implementations of the third aspect, in a sixth possible implementation of the third aspect, the measurement request message includes a measurement parameter of the UAOA, and the measurement parameter is used to indicate that the UAOA is a first plane angle and/or a second plane angle; and the first plane angle is a plane angle on a first plane, the second plane angle is a plane angle on a second plane, and the first plane is perpendicular to the second plane.

With reference to any one of the third aspect or the first to the sixth possible implementations of the third aspect, in a seventh possible implementation of the third aspect, the UAOA includes any one of the following angles: an UAOA determined by measuring a strongest path of the reference signal sent by the terminal device, and an UAOA determined by measuring a line-of-sight path of the reference signal sent by the terminal device.

With reference to any one of the third aspect or the first to the seventh possible implementations of the third aspect, in an eighth possible implementation of the third aspect, the positioning measurement parameter set further includes reference signal quality or a measured quality value obtained by measuring the reference signal sent by the terminal device, where the measured quality value is used to indicate reliability of the UAOA obtained by measuring the reference signal sent by the terminal device.

With reference to any one of the third aspect or the first to the eighth possible implementations of the third aspect, in a ninth possible implementation of the third aspect, the positioning measurement parameter set is carried in a NR positioning protocol annex or an F1 application protocol.

According to a fourth aspect, a network device is provided. The network device includes: a receiving unit, configured to receive a measurement request message sent by a location management function network element, where the measurement request message is used to indicate the first network element to measure a reference signal sent by a terminal device, to obtain a positioning measurement parameter set, the positioning measurement parameter set includes at least two uplink angles of arrival, and the first network element belongs to a positioning measurement network element set; and a sending unit, configured to send the positioning measurement parameter set to the location management function network element.

With reference to the fourth aspect, in a first possible implementation of the fourth aspect, the receiving unit is configured to: receive the measurement request message sent by an access management network element, where the measurement request message is sent after the access management network element receives a NR positioning protocol annex message sent by the location management function network element, and the NR positioning protocol annex message is used to indicate the access management network element to send the measurement request message to a network element in the positioning measurement network element set.

With reference to the fourth aspect or the first possible implementation of the fourth aspect, in a second possible implementation of the fourth aspect, the sending unit is configured to send the NR positioning protocol annex message to the access management network element, where the NR positioning protocol annex message includes the positioning measurement parameter set, to help the access management network element send the positioning measurement parameter set to the location management function network element.

With reference to any one of the fourth aspect or the first or the second possible implementation of the fourth aspect, in a third possible implementation of the fourth aspect, the measurement request message includes a measurement parameter of the UAOA, and the measurement parameter is used to indicate that the UAOA is a first plane angle and/or a second plane angle; and the first plane angle is a plane angle on a first plane, the second plane angle is a plane angle on a second plane, and the first plane is perpendicular to the second plane.

With reference to any one of the fourth aspect or the first to the third possible implementations of the fourth aspect, in a fourth possible implementation of the fourth aspect, the UAOA includes any one of the following angles: an UAOA determined by measuring a strongest path of the reference signal sent by the terminal device, and an UAOA determined by measuring a line-of-sight path of the reference signal sent by the terminal device.

With reference to any one of the fourth aspect or the first to the fourth possible implementations of the fourth aspect, in a fifth possible implementation of the fourth aspect, the positioning measurement parameter set further includes reference signal quality or a measured quality value obtained by measuring the reference signal sent by the terminal device, where the measured quality value is used to indicate reliability of the UAOA obtained by measuring the reference signal sent by the terminal device.

According to a fifth aspect, a network device is provided. The network device includes: a transceiver, configured to obtain a positioning measurement parameter set, where the positioning measurement parameter set at least includes at least two uplink angles of arrival that are obtained by measuring a reference signal sent by a terminal device; and a processor, configured to determine a location of the terminal device based on the at least two uplink angles of arrival in the positioning measurement parameter set.

With reference to the fifth aspect, in a first possible implementation of the fifth aspect, the network device further includes the transceiver, where the transceiver is configured to send a measurement request message to a network element in a positioning measurement network element set, to indicate the network element in the positioning measurement network element set to measure the reference signal sent by the terminal device, to obtain the positioning measurement parameter set, where the terminal device sends the reference signal on a predetermined uplink resource.

With reference to the fifth aspect or the first possible implementation of the fifth aspect, in a second possible implementation of the fifth aspect, the transceiver is configured to: receive the at least two uplink angles of arrival that are obtained through measurement by at least two network elements in the positioning measurement network element set; or receive the at least two uplink angles of arrival that are obtained through measurement by one network element in the positioning measurement network element set.

With reference to the fifth aspect or the first or the second possible implementation of the fifth aspect, in a third possible implementation of the fifth aspect, the transceiver is further configured to: before sending the measurement request message to the network element in the positioning measurement network element set, send a location information request to each network element in the positioning measurement network element set, where the location information request is used to indicate, to the network element in the positioning measurement network element set, an uplink transmission resource that is of the reference signal and that is allocated to the terminal device.

With reference to the first possible implementation of the fifth aspect, in a fourth possible implementation of the fifth aspect, the transceiver is configured to send a NR positioning protocol annex message to an access management network element, where the NR positioning protocol annex message is used to indicate the access management network element to send the measurement request message to the network element in the positioning measurement network element set.

With reference to the fifth aspect or the first to the fourth possible implementations of the fifth aspect, in a fifth possible implementation of the fifth aspect, the transceiver is configured to receive the NR positioning protocol annex message from the access management network element, where the NR positioning protocol annex message includes the positioning measurement parameter set, and the access management network element receives the positioning measurement parameter set from the network element in the positioning measurement network element set.

With reference to any one of the fifth aspect or the first to the fifth possible implementations of the fifth aspect, in a sixth possible implementation of the fifth aspect, the measurement request message includes a measurement parameter of the UAOA, and the measurement parameter is used to indicate that the UAOA is a first plane angle and/or a second plane angle; and the first plane angle is a plane angle on a first plane, the second plane angle is a plane angle on a second plane, and the first plane is perpendicular to the second plane.

With reference to any one of the fifth aspect or the first to the sixth possible implementations of the fifth aspect, in a seventh possible implementation of the fifth aspect, the UAOA includes any one of the following angles: an UAOA determined by measuring a strongest path of the reference signal sent by the terminal device, and an UAOA determined by measuring a line-of-sight path of the reference signal sent by the terminal device.

With reference to any one of the fifth aspect or the first to the seventh possible implementations of the fifth aspect, in an eighth possible implementation of the fifth aspect, the positioning measurement parameter set further includes reference signal quality or a measured quality value obtained by measuring the reference signal sent by the terminal device, where the measured quality value is used to indicate reliability of the UAOA obtained by measuring the reference signal sent by the terminal device.

With reference to any one of the fifth aspect or the first to the eighth possible implementations of the fifth aspect, in a ninth possible implementation of the fifth aspect, the positioning measurement parameter set is carried in a NR positioning protocol annex or an F1 application protocol.

According to a sixth aspect, a network device is provided. The network device includes: a transceiver, configured to receive a measurement request message sent by a location management function network element, where the measurement request message is used to indicate the first network element to measure a reference signal sent by a terminal device, to obtain a positioning measurement parameter set, the positioning measurement parameter set includes at least two uplink angles of arrival, and the first network element belongs to a positioning measurement network element set; and the transceiver, configured to send the positioning measurement parameter set to the location management function network element.

With reference to the sixth aspect, in a first possible implementation of the sixth aspect, the transceiver is configured to: receive the measurement request message sent by an access management network element, where the measurement request message is sent after the access management network element receives a NR positioning protocol annex message sent by the location management function network element, and the NR positioning protocol annex message is used to indicate the access management network element to send the measurement request message to a network element in the positioning measurement network element set.

With reference to the sixth aspect or the first possible implementation of the sixth aspect, in a second possible implementation of the sixth aspect, the transceiver is configured to send the NR positioning protocol annex message to the access management network element, where the NR positioning protocol annex message includes the positioning measurement parameter set, to help the access management network element send the positioning measurement parameter set to the location management function network element.

With reference to any one of the sixth aspect or the first or the second possible implementation of the sixth aspect, in a third possible implementation of the sixth aspect, the measurement request message includes a measurement parameter of the UAOA, and the measurement parameter is used to indicate that the UAOA is a first plane angle and/or a second plane angle; and the first plane angle is a plane angle on a first plane, the second plane angle is a plane angle on a second plane, and the first plane is perpendicular to the second plane.

With reference to any one of the sixth aspect or the first to the third possible implementations of the sixth aspect, in a fourth possible implementation of the sixth aspect, the UAOA includes any one of the following angles: an UAOA determined by measuring a strongest path of the reference signal sent by the terminal device, and an UAOA determined by measuring a line-of-sight path of the reference signal sent by the terminal device.

With reference to any one of the sixth aspect or the first to the fourth possible implementations of the sixth aspect, in a fifth possible implementation of the sixth aspect, the positioning measurement parameter set further includes reference signal quality or a measured quality value obtained by measuring the reference signal sent by the terminal device, where the measured quality value is used to indicate reliability of the UAOA obtained by measuring the reference signal sent by the terminal device.

According to a seventh aspect, a computer-readable storage medium is provided. The computer-readable storage medium stores instructions; and when the computer-readable storage medium runs on the network device according to any one of the third aspect or the implementations of the third aspect or any one of the fifth aspect or the implementations of the fifth aspect, the network device is enabled to perform the positioning method according to any one of the first aspect or the implementations of the first aspect.

According to an eighth aspect, a computer-readable storage medium is provided. The computer-readable storage medium stores instructions; and when the computer-readable storage medium runs on the network device according to any one of the fourth aspect or the implementations of the fourth aspect or any one of the sixth aspect or the implementations of the sixth aspect, the network device is enabled to perform the positioning method according to any one of the second aspect or the implementations of the second aspect.

According to a ninth aspect, a wireless communications apparatus is provided. An instruction is stored in the wireless communications apparatus; and when the wireless communications apparatus runs on the network device according to any one of the third aspect or the implementations of the third aspect or any one of the fifth aspect or the implementations of the fifth aspect, the network device is enabled to perform the positioning method according to any one of the first aspect or the implementations of the first aspect, and the wireless communications apparatus is a chip.

According to a tenth aspect, a wireless communications apparatus is provided. An instruction is stored in the wireless communications apparatus; and when the wireless communications apparatus runs on the network device according to any one of the fourth aspect or the implementations of the fourth aspect or any one of the sixth aspect or the implementations of the sixth aspect, the network device is enabled to perform the positioning method according to any one of the second aspect or the implementations of the second aspect, and the wireless communications apparatus is a chip.

DETAILED DESCRIPTION OF THE EMBODIMENTS

The following describes solutions with reference to the accompanying drawings. A solution in which a network device obtains an UAOA by measuring an uplink reference signal sent by UE, to implement accurate UE positioning is considered.

First, terms involved in the embodiments are explained and described. Details are as follows:

(1) A reference signal is a pilot signal and is a known signal that is sent by a transmit end to a receive end and that is used for channel estimation or channel sounding. The reference signal may be classified into an uplink reference signal and a downlink reference signal. The embodiments mainly relate to the uplink reference signal, for example, a reference signal sent by a terminal device to a base station on a network side.

Figure 1:
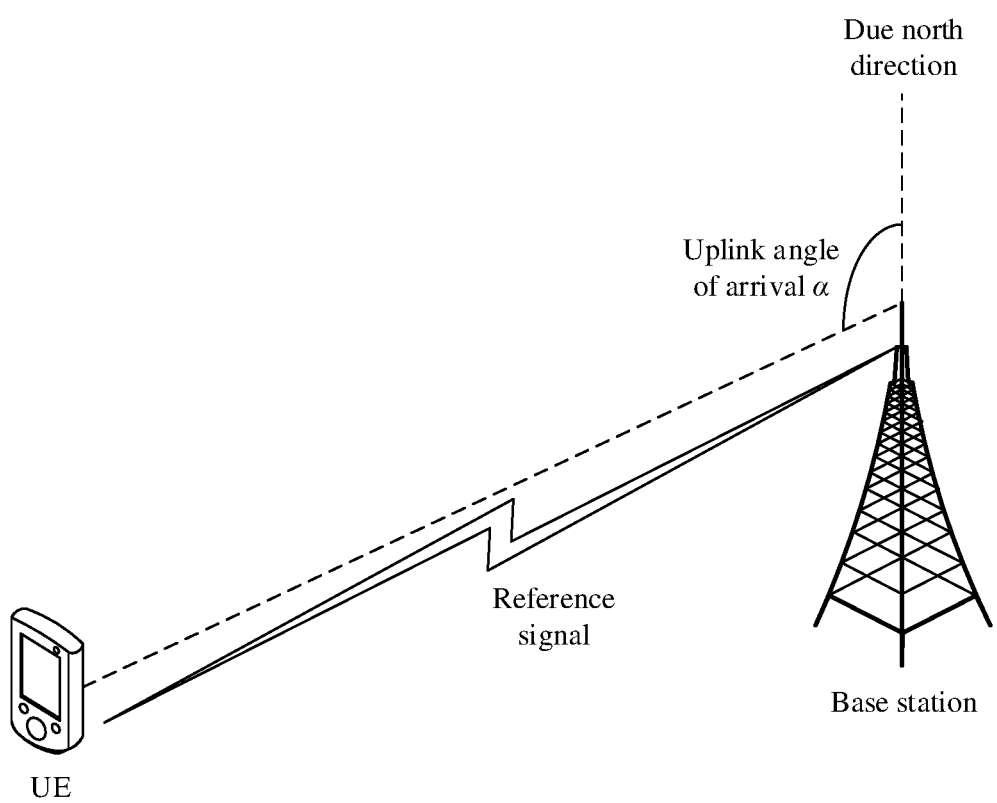
FIG. 1 is a schematic diagram of an UAOA in the conventional technology.

(2) In the embodiments, an UAOA of a reference signal is an angle between the reference signal sent by the terminal device and a direction (for example, a horizontal plane or a normal line of a horizontal plane) when the reference signal arrives at a network side device. For example, referring to FIG. 1, an UAOA of a reference signal sent by UE may be an included angle α between the reference signal sent by the UE and a due north direction when the reference signal arrives at a base station. As shown in FIG. 1, in the embodiments, a straight line from the UE to the base station may be determined based on the UAOA of the reference signal transmitted by the UE, and an included angle between the straight line and the due north direction is α. In the embodiments, the straight line is referred to as a direction line.

Generally, a reference signal is transmitted in the form of an electromagnetic wave, and the electromagnetic wave may be reflected, scattered, or the like due to various obstacles encountered in a space propagation process. Therefore, a reference signal received by a receive end is a superposition of signals on a plurality of propagation paths. A propagation path of the electromagnetic wave in the space propagation process may be a strongest path, a second strongest path, and a line-of-sight path. The strongest path is a path with strongest power in the propagation paths of the electromagnetic wave, the second strongest path is a path with second strongest power in the propagation paths of the electromagnetic wave, and the line-of-sight path is a propagation path in which the electromagnetic wave directly arrives at the receive end without encountering any obstacle in the propagation process.

Figure 2:
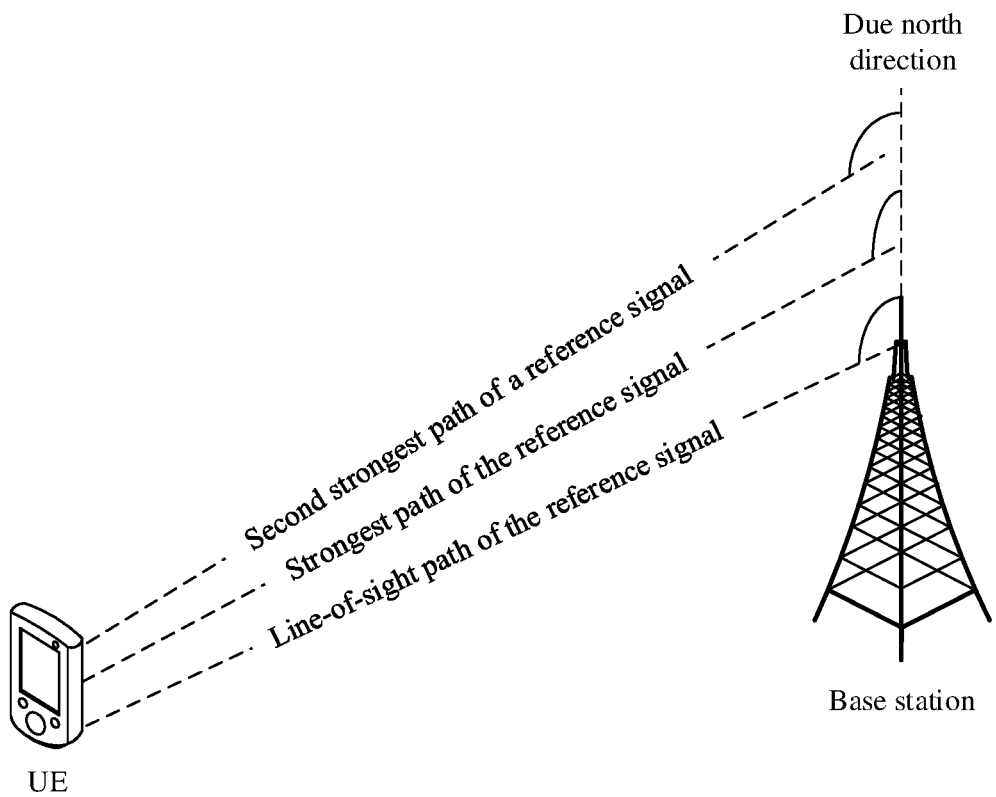
FIG. 2 is a schematic diagram of an UAOA according to an embodiment.

Referring to FIG. 2, in the embodiments, the UAOA of the reference signal may be an included angle between the strongest path of the reference signal and a direction when the reference signal arrives at the receive end, or an included angle between the second strongest path of the reference signal and a direction when the reference signal arrives at the receive end, or an included angle between the line-of-sight path of the reference signal and a direction when the reference signal arrives at the receive end.

Figure 3:
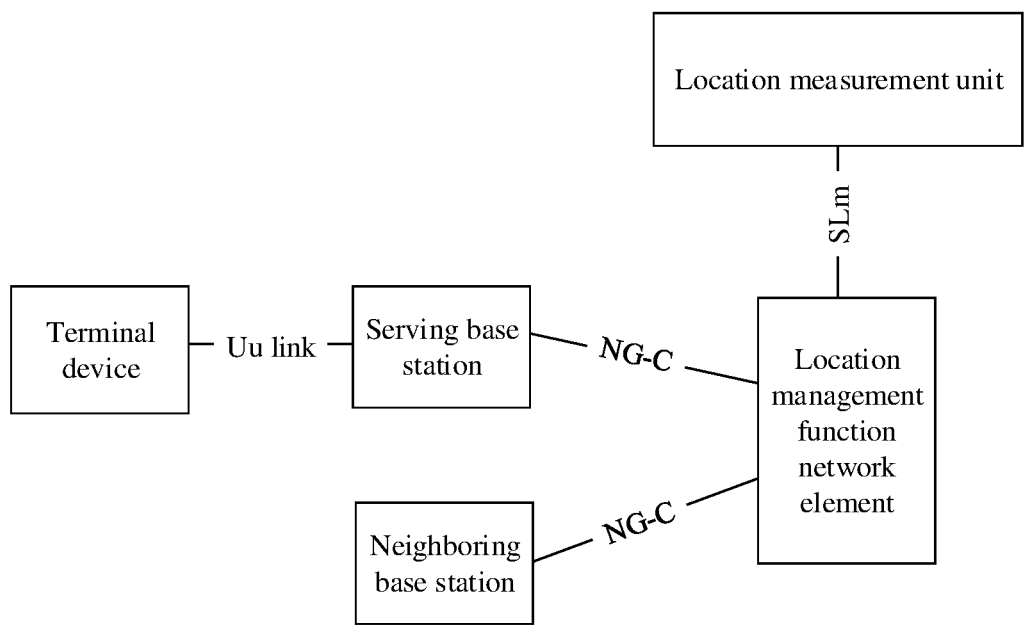
FIG. 3 is an architectural diagram of a communications system according to an embodiment.

FIG. 3 shows a communications system according to an embodiment. Referring to FIG. 3, the communications system includes a terminal device, a serving base station of the terminal device, a neighboring base station of the serving base station, a location management function network element (LMF), and a LMU. The serving base station of the terminal device provides an access service for the terminal device. After accessing the base station, the terminal device may communicate with a network side through the base station. The LMF is configured to perform positioning calculation on the terminal device based on a measurement result of another network element (for example, a base station). The base station and the LMU may measure a reference signal sent by the terminal device, to obtain a measurement result required for positioning the terminal device.

Referring to FIG. 3, the terminal device communicates with the serving base station through a cellular link (a Uu link), the serving base station and the neighboring base station communicate with the LMF through an NG-C interface, and the LMF communicates with the LMU through an SLm interface.

Figure 4:
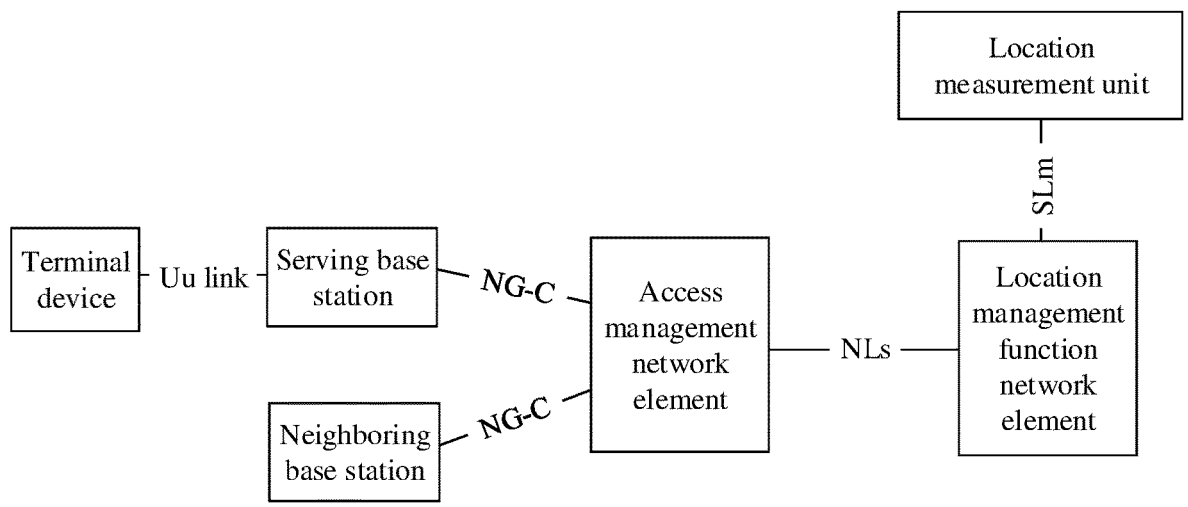
FIG. 4 is another architectural diagram of a communications system according to an embodiment.

Referring to FIG. 4, a communications system provided in an embodiment may further include an access management network element (for example: access and mobility management function, AMF). The AMF is a control plane network element provided by an operator, and is responsible for access control and mobility management when UE accesses an operator network. A serving base station and a neighboring base station communicate with the AMF through an NG-C interface, and the AMF communicates with an LMF through an NLs interface.

It should be noted that the network device in the embodiments may be a base station. The base station may have a plurality of forms, such as a macro base station, a micro base station, a relay station, and an access point. For example, the base station in the embodiments of the present invention may be a base station in NR. The base station in NR may also be referred to as a transmission reception point (TRP) or a next generation NodeB (gNB). Alternatively, the base station may be a base transceiver station (BTS) in global system for mobile communications (GSM) or code division multiple access (CDMA), a NodeB (NB) in a wideband code division multiple access (WCDMA) system, an evolved NodeB (eNB or eNodeB) in a LTE system, or a gNB in a 5G network.

The network device in the embodiments may alternatively include a device that is deployed in a radio access network and that can perform wireless communication with a terminal. For example, the network device may be a radio controller in a cloud radio access network (CRAN) scenario, or the network device may be a relay station, an access point, a network device in a 5G network, a network device in a future evolved public land mobile network (PLMN), or the like, for example, an evolved eNB, a radio network controller (RNC), a NB, a base station controller (BSC), a BTS, a home base station (for example, a home evolved nodeB, or a home node B, HNB), or a baseband unit (BBU).

In the embodiments, an apparatus for implementing a function of the network device may be the network device, or may be an apparatus that supports the network device in implementing the function, for example, a chip, a circuit, or another apparatus. In the embodiments, an example in which the apparatus for implementing the function of the network device is the network device is used to describe solutions provided in the embodiments.

The terminal device in the embodiments may also be referred to as a terminal and may be a device having a wireless transceiver function. The terminal device may be deployed on land, and includes an indoor device, an outdoor device, a handheld device, a wearable device, an in-vehicle device, or a vehicle-mounted device. Alternatively, the terminal device may be deployed on a water surface (for example, on a ship), or may be deployed in the air (for example, on an aircraft, a balloon, or a satellite). The terminal device may be UE. The UE includes a handheld device, a vehicle-mounted device, a wearable device, or a computing device that has a wireless communication function. For example, the UE may be a mobile phone (mobile phone), a tablet computer, or a computer having a wireless transceiver function. Alternatively, the terminal device may be a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in a smart city (smart city), a wireless terminal in a smart home (smart home), or the like.

In the embodiments, the apparatus that implements a function of the terminal may be the terminal or may be an apparatus that supports the terminal in implementing the function, such as a chip, a circuit, or another apparatus. In the embodiments, an example in which the apparatus that implements the function of the terminal is the terminal is used to describe the solutions provided in the embodiments.

In the conventional technology, a UE positioning procedure in an LTE system is defined. However, in a 5G NR system, network elements and interfaces between the network elements change, and a procedure of positioning UE by measuring a UTDOA in the conventional technology is no longer applicable to the 5G NR system.

The embodiments provide a positioning method. A location management function network element may obtain a positioning measurement parameter set, where the positioning measurement parameter set at least includes at least two UAOAs that are obtained by measuring a reference signal sent by a terminal device. The location management function network element may further determine a location of the terminal device based on the at least two UAOAs in the obtained positioning measurement parameter set.

In the 5G NR system, according to the method provided in the embodiments, a plurality of UAOAs may be obtained by measuring, for a plurality of times, the reference signal sent by the terminal device, so that two direction lines can be determined based on two of the UAOAs, and the terminal device is positioned by determining an intersection point of the two direction lines. It can be understood that the method provided in the embodiments can be applied to the 5G NR system to position the UE, and the UE can be positioned only by measuring the UAOA.

Figure 5:
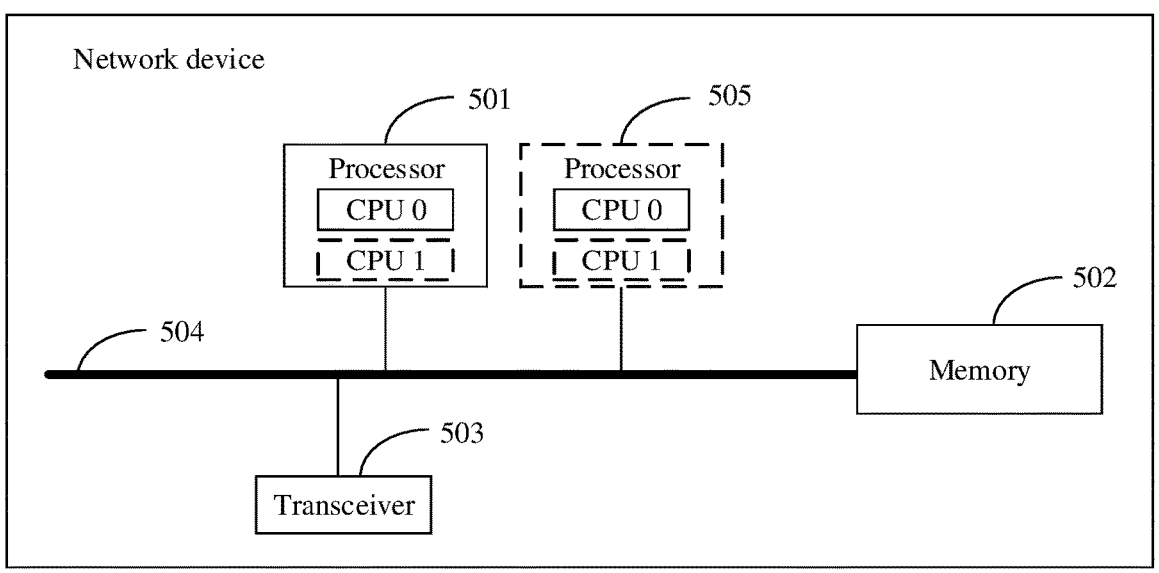
FIG. 5 is a structural block diagram of a network device according to an embodiment.

The positioning method provided in the embodiments may be applied to a network device shown in FIG. 5. The network device may be the location management function network element in the embodiments, and the location management function network element may be an LMF. As shown in FIG. 5, the network device may include at least one processor 501, a memory 502, a transceiver 503, and a communications bus 504.

The following describes components of the network device in detail with reference to FIG. 5.

The processor 501 is a control center of the network device, and may be one processor or may be a collective name of a plurality of processing elements. For example, the processor 501 is a central processing unit (CPU), or may be an application-specific integrated circuit (ASIC), or is configured as one or more integrated circuits implementing the embodiments, for example, one or more microprocessors (DSP) or one or more field programmable gate arrays (FPGA).

The processor 501 may run or execute a software program stored in the memory 502, and invoke data stored in the memory 502, to perform various functions of the network device.

In an implementation, in an embodiment, the processor 501 may include one or more CPUs, such as a CPU 0 and a CPU 1 in FIG. 5.

In an implementation, in an embodiment, the network device may include a plurality of processors, for example, the processor 501 and a processor 505 shown in FIG. 5. Each of the processors may be a single-core processor (single-CPU) or may be a multi-core processor (multi-CPU). The processor herein may refer to one or more network devices, circuits, and/or processing cores configured to process data (for example, a computer program instruction).

The memory 502 may be a read-only memory (ROM) or another type of static storage network device that can store static information and instructions, a random access memory (RAM) or another type of dynamic storage network device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blue-ray optical disc, and the like), or a magnetic disk storage medium or another magnetic storage network device, or any other medium that can carry or store expected program code in a form of an instruction or a data structure and that can be accessed by a computer, but is not limited thereto. The memory 502 may exist independently and is connected to the processor 501 through the communications bus 504. The memory 502 and the processor 501 may alternatively be integrated together.

The memory 502 is configured to store a software program for performing the solutions, and the processor 501 controls execution of the software program.

The transceiver 503 is configured to communicate with a second device. The transceiver 503 may further be configured to communicate with a communications network, such as the Ethernet, a radio access network (RAN), or a wireless local area network (WLAN). The transceiver 503 may include a receiving unit for implementing a receiving function and a sending unit for implementing a sending function.

The communications bus 504 may be an industry standard architecture (ISA) bus, a peripheral network device interconnect (PCI) bus, an extended industry standard architecture (EISA) bus, or the like. The bus may be classified into an address bus, a data bus, a control bus, and the like. For ease of representation, only one thick line is used to represent the bus in FIG. 5, but this does not mean that there is only one bus or only one type of bus.

A structure of the network device shown in FIG. 5 does not constitute a limitation on the network device, and the network device may include more or fewer components than those shown in the figure, or combine some components, or have different component arrangements.

Figure 6:
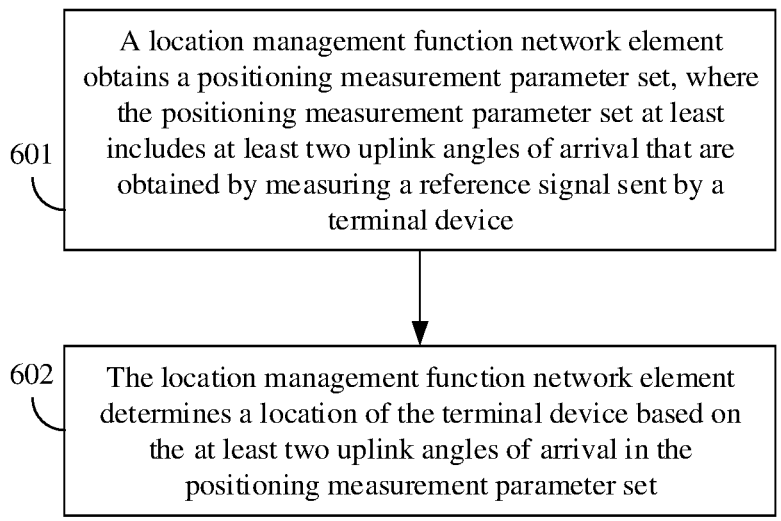
FIG. 6 is a schematic flowchart of a positioning method according to an embodiment.

An embodiment provides a positioning method. As shown in FIG. 6, the method includes the following steps.

601: A location management function network element obtains a positioning measurement parameter set, where the positioning measurement parameter set at least includes at least two UAOAs that are obtained by measuring a reference signal sent by a terminal device.

It should be noted that, in this embodiment, the location management function network element may indicate a same network element in a positioning measurement network element set to measure a plurality of (at least two) different reference signals that are sent by the terminal device by using different uplink resources. The network element may obtain the at least two UAOAs, and feed back, to the location management function network element, the at least two UAOAs obtained through measurement. Therefore, the positioning measurement parameter set obtained by the location management function network element may be the at least two uplink angles of arrival that are obtained through measurement by the network element in the positioning measurement network element set.

Alternatively, the location management function network element may indicate a plurality of different network elements in a positioning measurement network element set to separately measure the same reference signal sent by the terminal device. Each network element obtains one UAOA through measurement, and feeds back, to the location management function network element, the UAOA obtained through measurement by the network element. Therefore, alternatively, the positioning measurement parameter set obtained by the location management function network element may be at least two UAOAs that are obtained through measurement by the plurality of network elements in the positioning measurement network element set. In addition, the network element that measures the reference signal sent by the terminal device may be a base station, or may be an LMU. In other words, the network element in the positioning measurement network element set may be a base station, or may be an LMU. In addition, the reference signal sent by the terminal device may be a SRS, and is usually transmitted in space in a form of an electromagnetic wave.

In the communications system shown in FIG. 3, the LMF network element may directly send a measurement request message to the base station or the LMU, to indicate the base station or the LMU to measure the reference signal sent by the terminal device. The LMF network element may indicate one network element in the positioning measurement network element set to measure different reference signals sent by the terminal device, to obtain the plurality of uplink angles of arrival.

For example, the LMF network element sends the measurement request message to one network element in the positioning measurement network element set, to indicate the network element to measure a plurality of reference signals sent by the terminal device, where one UAOA may be obtained by measuring each reference signal, and the network element may obtain the plurality of UAOAs by measuring the plurality of reference signals.

Further, the network element may send, to the LMF network element, the plurality of UAOAs obtained through measurement, and the LMF network element obtains the positioning measurement parameter set that includes at least the plurality of UAOAs. It should be noted that the terminal device broadcasts the reference signal on predetermined uplink resources. The predetermined uplink resources herein may be a plurality of different uplink resources that correspond to one network element in the positioning measurement network element set.

For example, the positioning measurement parameter set includes two UAOAs. The LMF network element first sends the measurement request message to a first network element, to indicate the first network element to measure a reference signal sent by the terminal device by using a first uplink resource, to obtain a first UAOA, and indicates, by using the measurement request message, the first network element to measure a reference signal sent by the terminal device by using a second uplink resource, to obtain a second UAOA.

The measurement request message sent by the location management function network element may carry reference signal configuration information and an UAOA measurement request. The reference signal configuration information indicates the first uplink resource and the second uplink resource. The first network element may receive, by using the first uplink resource and the second uplink resource that are indicated by the reference signal configuration information in the measurement request message, the reference signals sent by the terminal device. In addition, the first network element determines, based on the UAOA measurement request in the measurement request message sent by the location management function network element, that the reference signal sent by the terminal device needs to be measured, so that the UAOA is obtained. Further, the first network element further feeds back a measurement result to the LMF network element. In other words, the LMF network element may obtain a plurality of UAOAs that are sent by the first network element, that is, obtain the positioning measurement parameter set.

Figure 7:
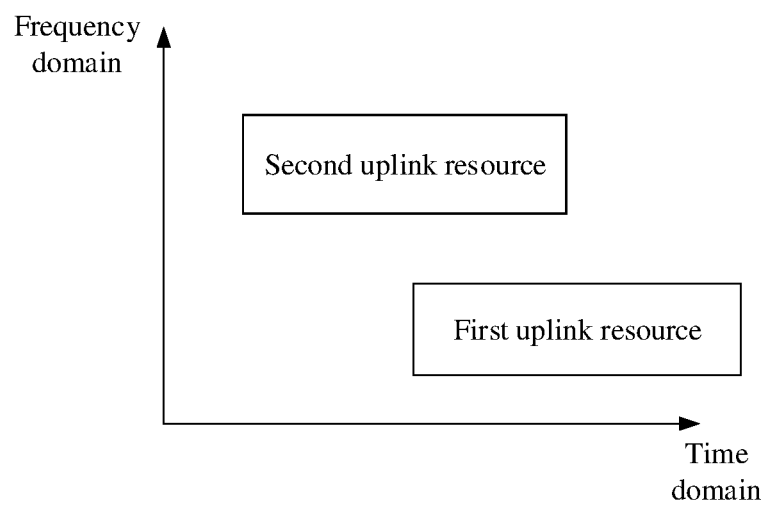
FIG. 7 is a schematic diagram of an uplink resource according to an embodiment.

It should be noted that the first uplink resource and the second uplink resource are different uplink resources. Referring to FIG. 7, the first uplink resource and the second uplink resource partially overlap in time domain or do not overlap at all in time domain, and the first uplink resource and the second uplink resource partially overlap in frequency domain or do not overlap at all in frequency domain.

In some embodiments, the LMF network element may indicate a plurality of network elements in the positioning measurement network element set to measure the same reference signal sent by the terminal device. Each network element may obtain one UAOA by measuring the reference signal sent by the terminal device, and feeds back, to the LMF network element, the UAOA obtained through measurement by the network element. The LMF network element obtains a plurality of (at least two) UAOAs, that is, obtains the positioning measurement parameter set.

For example, the positioning measurement parameter set includes two UAOAs. The LMF network element sends the measurement request message to two network elements in the positioning measurement network element set, and the two network elements (for example, two base stations or two LMUs) separately measure the same reference signal sent by the terminal device, to obtain the two UAOAs. For example, the measurement request message sent by the location management function network element may carry reference signal configuration information and an UAOA measurement request. The reference signal configuration information indicates the predetermined uplink resource, the predetermined uplink resource corresponds to a plurality of network elements, and all the plurality of network elements may receive the reference signal on the predetermined uplink resource. A first network element and a second network element may receive, by using the uplink resource indicated by the reference signal configuration information in the measurement request message, the reference signal sent by the terminal device. In addition, the first network element and the second network element may further determine, based on the UAOA measurement request in the measurement request message sent by the location management function network element, that the reference signal sent by the terminal device needs to be measured, so that the UAOA is obtained.

Further, the first network element and the second network element feed back a measurement result to the location management function network element. In other words, the location management function network element may receive an UAOA fed back by the first network element, receive an UAOA fed back by the second network element, and further obtain the positioning measurement parameter set. It should be noted that the first network element and the second network element measure the same reference signal. For example, after the terminal device broadcasts the reference signal by using one uplink resource, both the first network element and the second network element may receive the reference signal broadcast by the terminal device, and may further measure the reference signal to obtain the uplink angles of arrival.

It should be understood that only two network elements, that is, the first network element and the second network element, are used as an example to measure the reference signal sent by the terminal device. Alternatively, a plurality of network elements may measure the reference signal sent by the terminal device, to obtain a plurality of uplink angles of arrival. This is not limited in the embodiments.

In the communications system shown in FIG. 4, communication between the LMF network element and the base station needs to be forwarded by the AMF. For example, when the LMF network element indicates one network element in the positioning measurement network element set to measure different reference signals sent by the terminal device, to obtain a plurality of UAOAs, the LMF network element sends a NR positioning protocol annex message to the access management network element, and indicates, by using the NR positioning protocol annex message, the access management network element to send the measurement request message to the network element (for example, the first network element) in the positioning measurement network element set. For example, the NR positioning protocol annex message may carry an identifier of the first network element, the reference signal configuration information, and the UAOA measurement request. The reference signal configuration information indicates a plurality of different uplink resources, the plurality of different uplink resources correspond to a plurality of network elements, and each network element may receive and measure, by using one of the uplink resources, an uplink resource sent by the terminal device, for example, the first uplink resource and the second uplink resource.

Further, the access management network element may send the measurement request message to the first network element based on the identifier of the first network element in the new radio positioning protocol annex message, to indicate the first network element to measure two reference signals sent by the terminal device. The measurement request message sent by the access management network element to the first network element carries the reference signal configuration information and the UAOA measurement request, and the first network element may receive, by using the first uplink resource and the second uplink resource that are indicated by the reference signal configuration information in the measurement request message, the reference signals sent by the terminal device.

In addition, the first network element determines, based on the UAOA measurement request in the measurement request message sent by the location management function network element, that the reference signal sent by the terminal device needs to be measured, so that the UAOA is obtained. For example, a reference signal sent by the terminal device on the first uplink resource is measured, so that an uplink angle of arrival is obtained, and a reference signal sent by the terminal device on the second uplink resource is measured, so that an UAOA is obtained.

Further, the first network element may further forward the measurement result through the access management network element. For example, the first network element sends, to the access management network element, the plurality of UAOAs that are obtained through measurement, and the access management network element may forward the plurality of received UAOAs to the LMF network element. Therefore, the LMF network element may obtain the plurality of UAOAs, that is, obtain the positioning measurement parameter set including the at least two UAOAs.

Alternatively, the LMF network element may indicate a plurality of (at least two) network elements in the positioning measurement network element set to separately measure the same reference signal sent by the terminal device, to obtain the plurality of UAOAs.

For example, the LMF network element sends the NR positioning protocol annex message to the access management network element, and indicates, by using the NR positioning protocol annex message, the access management network element to send the measurement request message to the plurality of network elements in the positioning measurement network element set. Two network elements are used as an example. The access management network element sends the measurement request message to the first network element and the second network element in the positioning measurement network element set. The NR positioning protocol annex message may carry the identifier of the first network element, an identifier of the second network element, the reference signal configuration information, and the UAOA measurement request. The reference signal configuration information indicates an uplink resource used by the terminal device to send the reference signal.

Further, the access management network element may send the measurement request message to the first network element based on the identifier of the first network element in the NR positioning protocol annex message, to indicate the first network element to measure the reference signal sent by the terminal device. Alternatively, the access management network element may further send the measurement request message to the second network element based on the identifier of the second network element in the NR positioning protocol annex message, to indicate the second network element to measure the reference signal sent by the terminal device. The measurement request message sent by the access management network element to the first network element and the second element carries the reference signal configuration information and the UAOA measurement request, and the first network element and the second network element may separately receive, by using the uplink resource indicated by the reference signal configuration information in the measurement request message, the reference signal sent by the terminal device. In addition, the first network element and the second network element determine, based on the UAOA measurement request in the measurement request message sent by the LMF network element, that the reference signal sent by the terminal device needs to be measured, so that the UAOA is obtained.

Further, each of the plurality of network elements that measure the reference signal may further forward, to the LMF network element by using the access management network element, the UAOA obtained through measurement by the network element. Using an example in which the two network elements measure the same reference signal of the terminal device, the first network element and the second network element may each forward a measurement result by using the access management network element. The LMF network element receives an UAOA obtained through measurement by the first network element and an UAOA obtained through measurement by the second network element, where the two uplink angles of arrival are forwarded by the access management network element. For example, the plurality of network elements may send, to the access management network element, the new radio positioning protocol annex (NRPPa) messages including the NAOAs obtained through measurement by the plurality of network elements. The access management network element summarizes the UAOAs in the NRPPa messages sent by the plurality of network elements, adds the UAOAs to one NRPPa message, sends the NRPPa message to the LMF network element, and sends, by using the NRPPa message, the UAOAs obtained through measurement by the plurality of network elements.

In some embodiments, before the LMF network element indicates another network element to measure the reference signal sent by the terminal device, a serving base station of the terminal device further needs to allocate, to the terminal device, an uplink resource used to send the reference signal. In an implementation, the LMF network element may send the NRPPa message to the serving base station of the terminal device, to indicate the serving base station of the terminal device to allocate the uplink resource to the terminal device. Alternatively, the serving base station of the terminal device may determine to position the terminal device, and autonomously allocate the uplink resource to the terminal device.

Further, after the LMF network element sends the measurement request message to the another network element, the serving base station of the terminal device sends a configuration message to the terminal device to indicate the uplink resource allocated to the terminal device. For example, the configuration message may carry the reference signal configuration information. The reference signal configuration information indicates an uplink resource used by the terminal device to send the reference signal, or the reference signal configuration information indicates the first uplink resource and the second uplink resource that are used by the terminal device to send the reference signal.

In some embodiments, the measurement request message sent by the LMF network element may be an NRPPa message. In addition, the measurement request message sent by the LMF network element may further include a signal quality measurement request. The signal quality measurement request is used to indicate the network element receiving the measurement request message to measure the reference signal sent by the terminal device, to obtain reference signal quality. The reference signal quality is, for example, reference signal received power (RSRP) of the reference signal, or reference signal received quality (RSRQ) of the reference signal.

Therefore, a network element (for example, the first network element or the second network element in this embodiment) in the positioning measurement network element set may feed back, to the location management function network element, reference signal quality (for example, the RSRP or the RSRQ) obtained by measuring the reference signal sent by the terminal device. Further, the positioning measurement parameter set obtained by the location management function network element may further include the reference signal quality.

In the communications system shown in FIG. 3, after receiving the measurement request message sent by the location management function network element, the network element in the positioning measurement network element set may send, to LMF network element, the UAOA and the reference signal quality that are obtained through measurement. In the communications system shown in FIG. 4, after receiving the measurement request message sent by the LMF network element, the network element in the positioning measurement network element set may send, to the access management network element, the UAOA and the reference signal quality that are obtained through measurement, and the access management network element forwards the received UAOA and the received reference signal quality to the location management function network element.

In some embodiments, a network element (for example, the first network element or the second network element in this embodiment) in the positioning measurement network element set may feed back, to the LMF network element, reference signal quality (for example, the RSRP or the RSRQ) obtained by measuring the reference signal sent by the terminal device, or may feed back, to the LMF network element, a measured quality value obtained by measuring the reference signal sent by the terminal device. It should be noted that the measured quality value is used to indicate reliability of the UAOA obtained by measuring the reference signal sent by the terminal device. The LMF network element may determine, based on the measured quality value, whether the UAOA fed back by the network element is reliable, or may determine, with reference to signal quality, whether the UAOA fed back by the network element is reliable.

It should be noted that according to the method provided in this embodiment, the terminal device may be positioned in a direction on a plane, or the terminal device may be positioned in a direction in space. In an implementation, the measurement request message sent by the LMF network element may further include a measurement parameter of the UAOA, and the measurement parameter is used to indicate that the UAOA is a first plane angle and/or a second plane angle. The first plane angle is a plane angle on a first plane, the second plane angle is a plane angle on a second plane, and the first plane is perpendicular to the second plane. For example, the measurement parameter of the UAOA may be two bits. The first bit represents whether an UAOA on the first plane needs to be measured, and the second bit represents whether an UAOA on the second plane needs to be measured. In some embodiments, a bit value of 0 indicates that the UAOA on the plane does not need to be measured, and a bit value of 1 indicates that the UAOA on the plane needs to be measured. If the measurement parameter of the UAOA is 01, it indicates that the UAOA on the first plane needs to be measured. If the measurement parameter of the UAOA is 10, it indicates that the UAOA on the second plane needs to be measured. If the measurement parameter of the UAOA is 11, it indicates that the UAOAs on the first plane and the second plane need to be measured.

In an implementation, the network element may obtain an UAOA by measuring a strongest path of the reference signal sent by the terminal device, or may obtain an UAOA by measuring a line-of-sight path of the reference signal sent by the terminal device, or may obtain an UAOA by measuring a second strongest path of the reference signal sent by the terminal device. In other words, the UAOA in this embodiment may include any of the following angles: the UAOA determined by measuring the strongest path of the reference signal sent by the terminal device, and the UAOA determined by measuring the line-of-sight path of the reference signal sent by the terminal device.

602: The LMF network element determines a location of the terminal device based on the at least two UAOAs in the positioning measurement parameter set.

Figure 8:
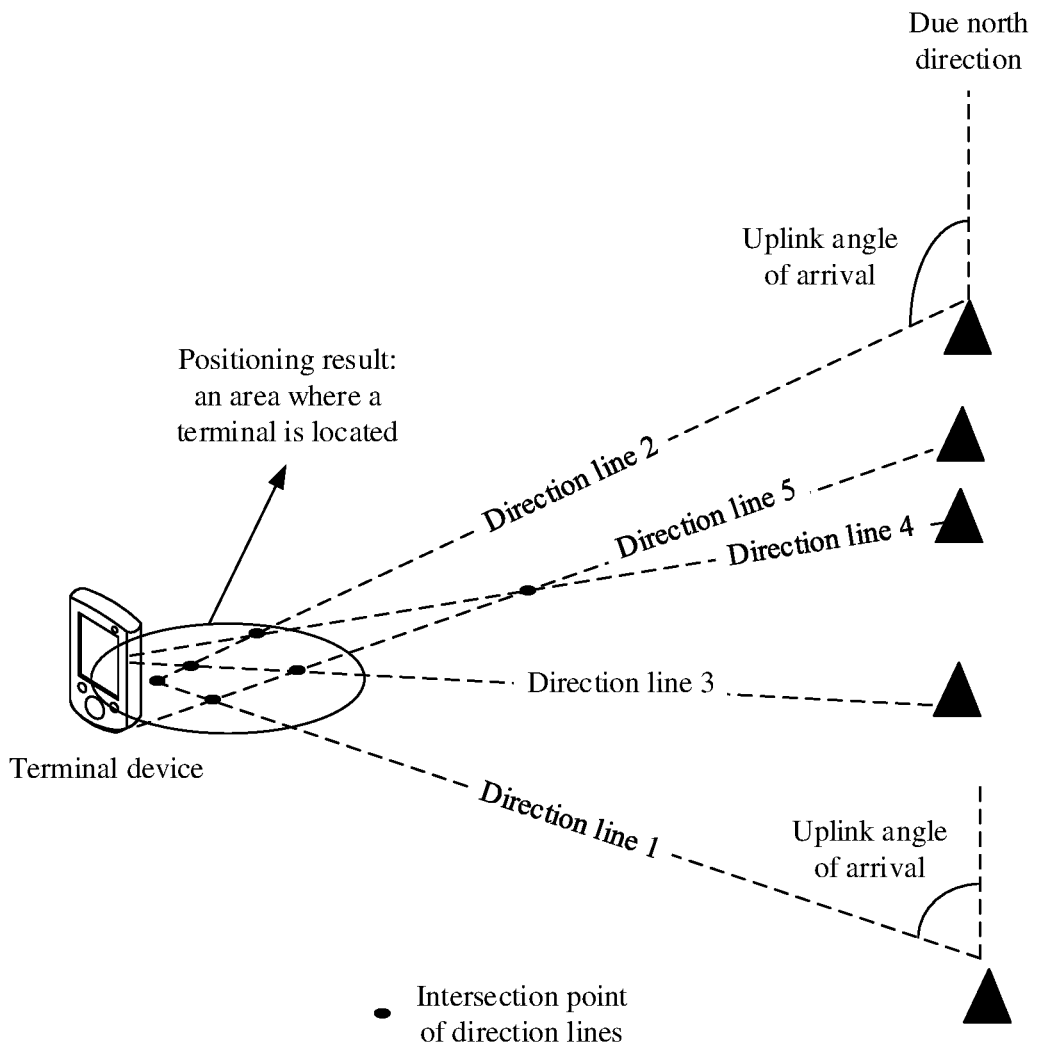
FIG. 8 is a schematic diagram of direction line positioning according to an embodiment.

In an implementation, after receiving the at least two UAOAs obtained through measurement by the plurality of network elements, the LMF network element may determine one direction line based on each UAOA, and may determine at least two direction lines based on the at least two UAOAs. Referring to FIG. 8, there may be one intersection point for every two direction lines, and a plurality of intersection points may be determined based on at least two direction lines. As shown in FIG. 8, an area in which most intersection points are centralized may be used as the location of the terminal device.

Figure 9:
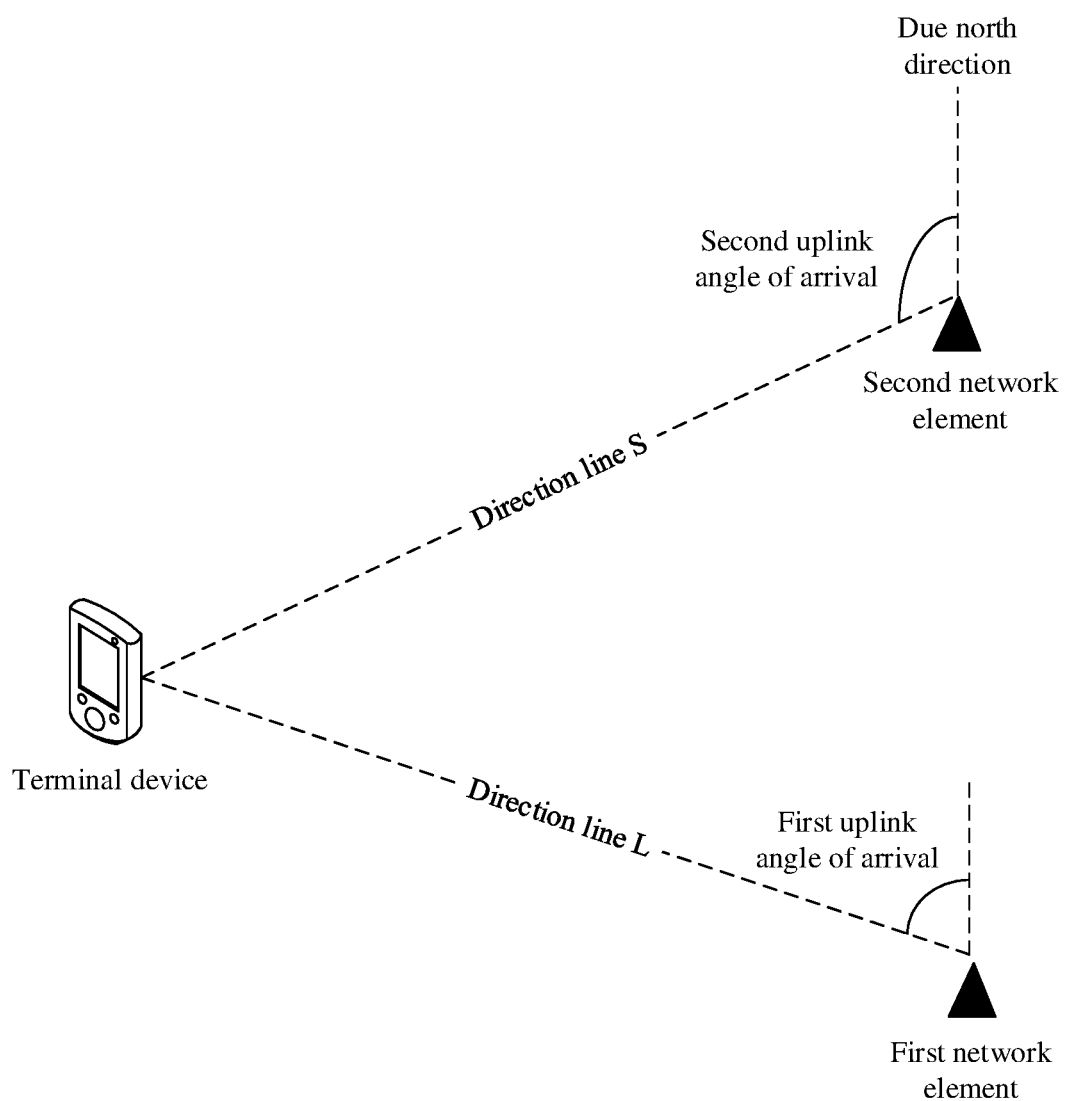
FIG. 9 is another schematic diagram of direction line positioning according to an embodiment.

For example, one network element in the positioning measurement network element set measures one reference signal to obtain one UAOA. The LMF network element may position the terminal device based on UAOAs obtained through measurement by two network elements. Referring to FIG. 9, a first uplink angle is an UAOA obtained by the first network element by measuring the reference signal sent by the terminal device, and a second uplink angle is an UAOA obtained by the second network element by measuring the reference signal sent by the terminal device. A direction line L may be determined based on the first network element and the first uplink angle, a direction line S may be determined based on the second network element and the second uplink angle, and an intersection point of the direction line L and the direction line S may be determined as the location of the terminal device.

Figure 10:
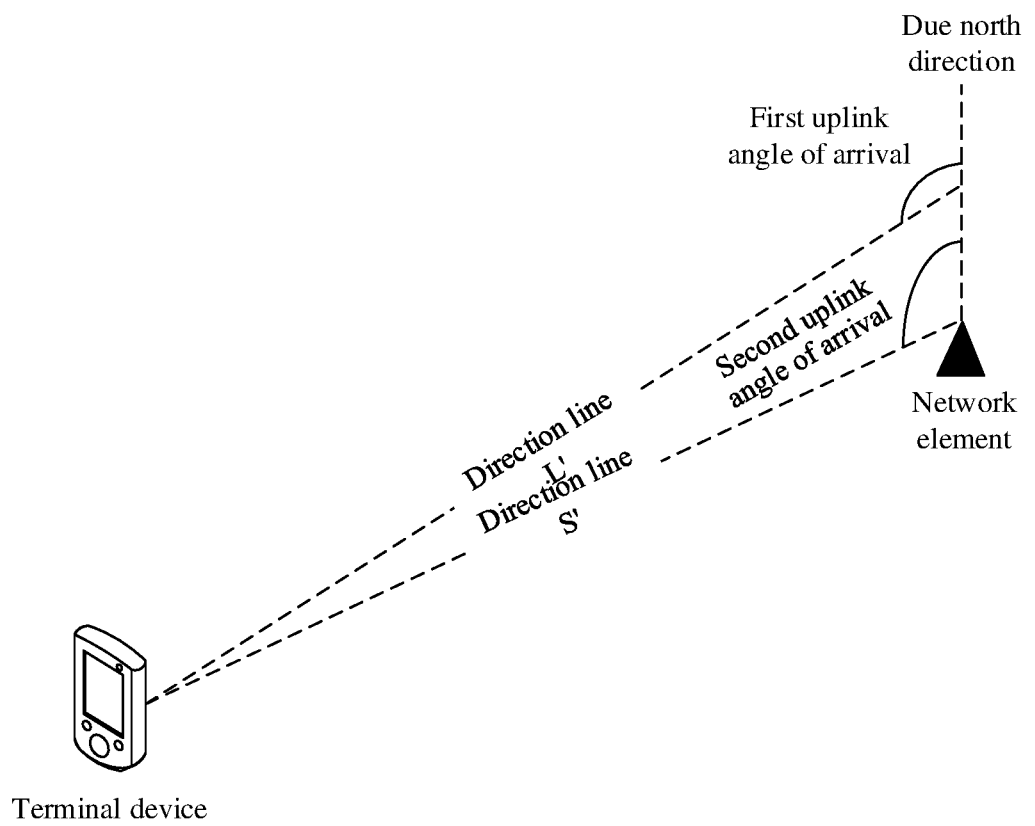
FIG. 10 is another schematic diagram of direction line positioning according to an embodiment.

In some embodiments, after receiving the at least two UAOAs obtained through measurement by the same network element, the LMF network element may determine the location of the terminal device based on two of the at least two UAOAs. For example, one network element in the positioning measurement network element set measures one reference signal to obtain two UAOAs. Referring to FIG. 10, a first uplink angle is an UAOA obtained by the first network element by measuring the reference signal sent by the terminal device, and a second uplink angle is an UAOA obtained by the first network element by measuring another reference signal sent by the terminal device. A direction line L' may be determined based on the first network element and the first uplink angle, a direction line S' may be determined based on the second network element and the second uplink angle, and an intersection point of the direction line L' and the direction line S' may be determined as the location of the terminal device.

Figure 11:
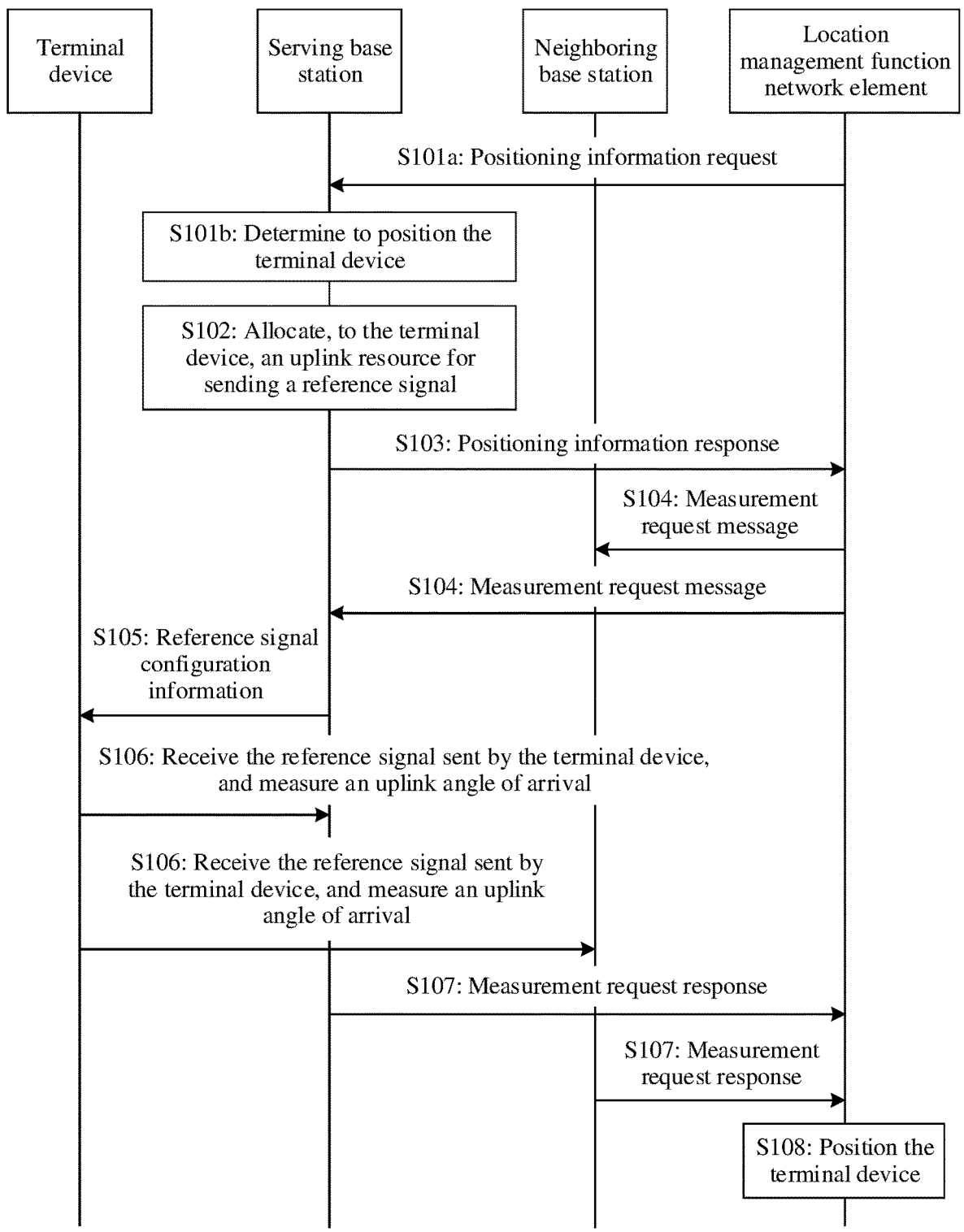
FIG. 11 is another schematic flowchart of a positioning method according to an embodiment

The positioning method provided in this embodiment is described below by using an example in which the positioning measurement network element set includes two UAOAs. In some embodiments, the LMF network element indicates, by using the measurement request message, two base stations in the positioning measurement network element set to measure an SRS sent by the terminal device. For example, as shown in FIG. 11, the following steps are included.

S101a: A LMF network element sends a location information request (location information request) to a serving base station of a terminal device, to trigger the serving base station of the terminal device to allocate, to the terminal device, an uplink resource used by the terminal device to send an SRS. The location management function network element may send an NRPPa message. The NRPPa message includes: Message Type, NRPPa Transaction ID, and Requested SRS Transmission Characteristics. Message Type is used to identify a sending signal, and NRPPa Transaction ID is used to identify messages in a positioning procedure of a same terminal device. It may be considered that all the messages in the positioning procedure of the same terminal device may be identified by using same NRPPa Transaction ID. Requested SRS Transmission Characteristics indicates a quantity of SRSs to be transmitted and a bandwidth requirement that are required for UAOA positioning. It should be noted that, UAOA positioning refers to a method for positioning the terminal device by using an UAOA at which the reference signal sent by the terminal device arrives at a base station.

S101b: The serving base station of the terminal device determines to position the terminal device.

It should be noted that either step S101a or step S101b needs to be performed.

S102: The serving base station of the terminal device allocates, to the terminal device, an uplink resource for sending the reference signal.

It should be noted that when there is no available uplink resource, the serving base station of the terminal device allocates an empty resource to the terminal device.

S103: The serving base station of the terminal device sends a location information response to the LMF network element. The location information response may be an NRPPa message. The sent NRPPa message may include Message Type, NRPPa Transaction ID, and UL Configuration. UL Configuration represents an uplink configuration parameter. In some embodiments, the NRPPa message sent by the base station may further include Criticality Diagnostics. The parameter is sent by the base station when the base station does not interpret a message sent by the LMF network element, fails to receive a message sent by the LMF network element, or has a logic error.

When an uplink resource configuration returned by the serving base station of the terminal device to the location management function network element is empty, the LMF network element may use another positioning method.

S104: The LMF network element sends a measurement request message to the serving base station of the terminal device and a neighboring base station of the serving base station, where the measurement request message may be an NRPPa message. Parameters carried in the NRPPa message are shown in the following Table 1.

TABLE 1

| Parameter Name | Parameter Status | Parameter Description |
| --- | --- | --- |
| Message Type | Mandatory | Used to identify a sending signal |
| NRPPa Transaction ID | Mandatory | Used to identify all messages in a positioning procedure of the same terminal device |
| LMF Measurement ID | Mandatory | Used to identify all messages in a positioning procedure of the same terminal device |
| UAOA Measurement Configuration (UAOA measurement request) | Mandatory | Indicating a network element to measure the reference signal sent by the terminal device, to obtain the UAOA |
| Angle range (the angle range is the measurement parameter in this embodiment of the present invention) | Mandatory | Plane angle AOA ∈ [−180°, 180°] First plane angle AAOA ∈ [−180°, 180°] Second plane angle ZAOA ∈ [0°, 180°] |
| SRS Configuration | Mandatory | Indicating the uplink resource for sending the SRS |
| Number of Transmissions (Quantity of transmissions) | Mandatory | Quantity of SRSs in a transmission periodicity |
| Search Window Parameters | Optional | Used to measure a relative uplink arrival time |
| Measurement Quantities (signal quality measurement request) | Optional | Indicating the base station to measure the reference signal sent by the terminal device, to obtain reference signal quality |

S105: After a resource is successfully configured, the serving base station of the terminal device sends reference signal configuration information to the terminal device.

Then, the terminal device may broadcast the reference signal by using the uplink resource allocated by the serving base station.

S106: The serving base station of the terminal device and the neighboring base station receive the reference signal sent by the terminal device, measure an incident angle of the reference signal, and use the incident angle of the reference signal as the UAOA obtained through measurement.

The UAOA may be obtained by measuring an incident angle of a strongest path of the reference signal, or the UAOA may be obtained by measuring an incident angle of a line-of-sight path of the reference signal. In addition, the UAOA obtained by measuring an incident angle of a second strongest path of the reference signal may be used as an alternative option.

S107: The serving base station of the terminal device and the neighboring base station separately send a measurement request response to the LMF network element.

The measurement request response carries a measurement result of the neighboring base station and a measurement result of the serving base station, and the LMF network element may obtain the positioning measurement parameter set by obtaining the measurement results of the serving base station and the neighboring base station. In some embodiments, the measurement request response may be an NRPPa message. Parameters carried in the NRPPa message are shown in the following Table 2:

TABLE 2

| Information Name | | Parameter Status | Description |
| --- | --- | --- | --- |
| Message Type | | Mandatory | Used to identify a sending signal |
| NRPPa Transaction ID | | Mandatory | Identifying a message in the same step |
| LMF Measurement ID | | Mandatory | Identifying all steps of same measurement |
| UAOA Measurements (measurement result) | UAOA | Mandatory | Representing an UAOA that is on a plane and that is obtained by measuring the reference signal sent by the terminal device |
| | UAAOA UZAOA | Mandatory | AAOA represents a pitch angle obtained by measuring the reference signal sent by the terminal device; ZAOA represents an azimuth obtained by measuring the reference signal sent by the terminal device |
| | UL-EARFCN | Mandatory | Representing a center frequency of the uplink resource used by the terminal device to send the reference signal |
| gNB Information (base station information) | Location information | Mandatory | Indicating location coordinates and the height of the base station |
| | Antenna array information (antenna information) | Mandatory | Indicating an arrangement mode of antenna array elements of the base station and a quantity of array elements |
| | Legal direction of antenna array | Mandatory | Indicating a normal direction of a base station antenna |
| Measurement quality (measured quality value) | | Mandatory | Indicating reliability of the UAOA obtained through measurement by the base station, where the reliability is related to a historical measurement result and the RSRP/RSRQ obtained by the base station by measuring the reference signal |
| SRS Measurements (reference signal quality) | RSRP | Mandatory | Reference signal received power |
| | RSRQ | Mandatory | Reference signal received quality |
| Criticality Diagnostics (criticality diagnostics) | | Optional | Sent when a received message is not interpreted, is lost, or has a logic error |

It should be noted that the LMF network element may determine, based on antenna information in the NRPPa message fed back by the base station, whether the UAOA fed back by the base station is reliable. For example, when there are a large quantity of antennas of the base station, the UAOA obtained through measurement is relatively accurate. When the quantity of antennas of the base station is relatively small, the UAOA obtained through measurement may be inaccurate and is of little reference value. The LMF network element may select an UAOA obtained through measurement by another base station. In addition, the azimuth of the reference signal is an included angle between a projection of a propagation path of the reference signal on a horizontal plane and a due north direction, and the azimuth of the reference signal is AAOA∈[10°, 360°]. The pitch angle of the reference signal is an included angle between the projection of the propagation path of the reference signal on the horizontal plane and the propagation path of the reference signal. The pitch angle of the reference signal is ZAOA∈[−90°, 90°]. In addition, the pitch angle of the reference signal may alternatively be an included angle between the propagation path of the reference signal and a zenith direction. The pitch angle of the reference signal is ZAOA∈[0°, 180°]. The first plane angle in this embodiment may be considered as the azimuth of the reference signal, and the second plane angle in this embodiment may be considered as the pitch angle of the reference signal.

S108: The LMF network element positions the terminal device.

In an implementation, the LMF network element may position the terminal device based on the measurement results fed back by the serving base station of the terminal device and the neighboring base station. For example, one direction line is determined based on the first UAOA fed back by the serving base station of the terminal device, one direction line is determined based on the second UAOA fed back by the neighboring base station, and an intersection point of the two direction lines is determined as the location of the terminal device.

In this embodiment, the base station may convert a reference signal pilot signal measured in time domain into a frequency domain signal, and calculate the UAOA according to discrete Fourier transform (DFT) or a MUSIC algorithm (spatial spectrum estimation algorithm). The spatial spectrum estimation algorithm separates a signal subspace and a noise subspace by using a covariance matrix (Rx) of received data, and forms a spatial scanning spectrum by using orthogonality between a signal direction vector and the noise subspace, to search for a spectrum peak in an entire domain, thereby implementing parameter estimation of a signal.

In some embodiments, measurement quality may be obtained in the following two manners: (1) A comparison table is established by collecting statistics of previous measurement results, and measurement quality corresponding to an UAOA in this measurement is obtained by looking up the table. (2) The RSRP and the RSRQ that are obtained by measuring the reference signal of the terminal device are measured, to calculate and obtain the measurement quality corresponding to the UAOA.

Figure 12:
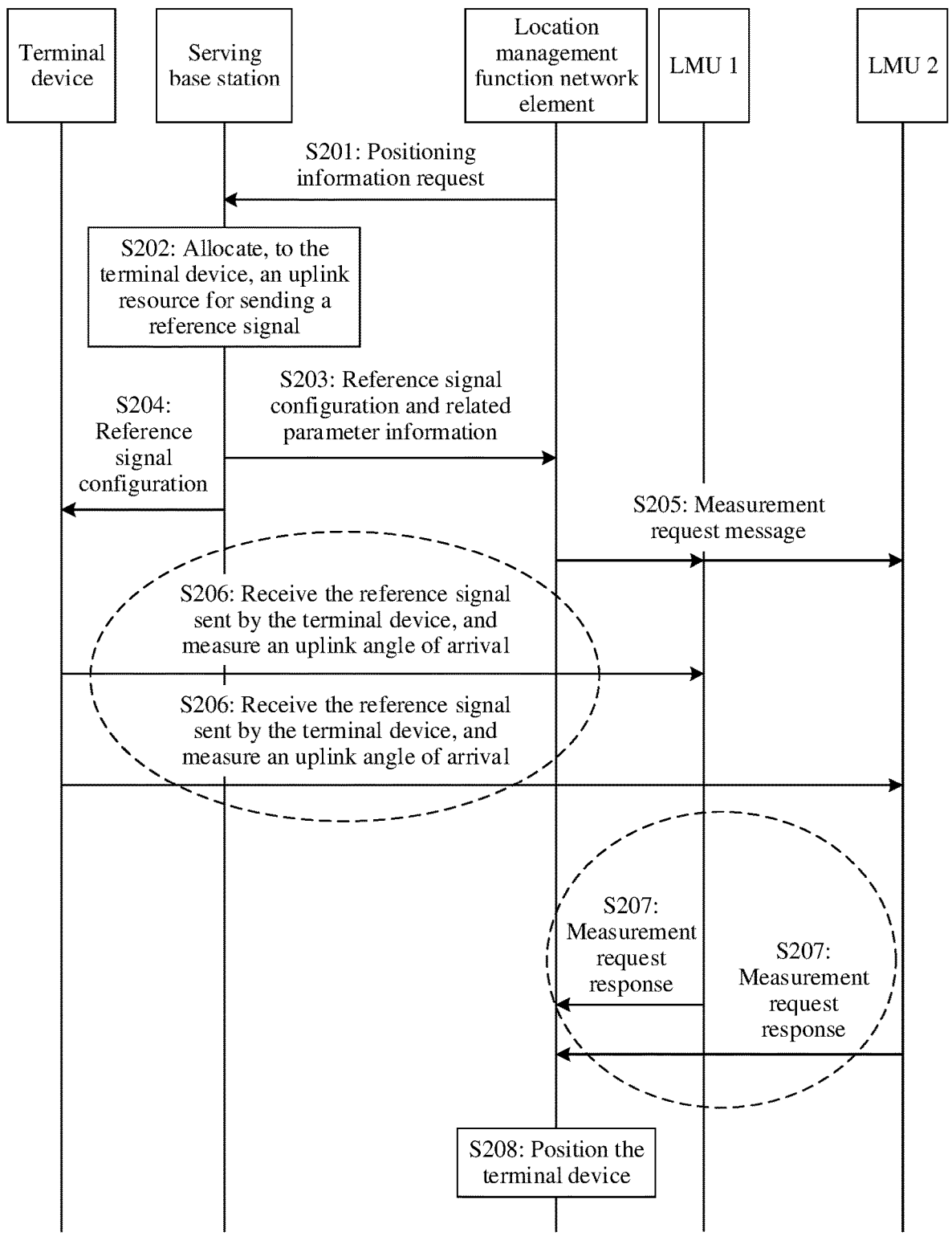
FIG. 12 is another schematic flowchart of a positioning method according to an embodiment.

In some embodiments, the LMF network element may indicate at least two LMUs to measure the reference signal sent by the terminal device, to obtain the UAOA. The following uses two LMUs as an example to describe the positioning method provided in this embodiment. As shown in FIG. 12, the positioning method includes the following steps.

S201: A LMF network element sends a location information request to a serving base station of a terminal device, to trigger the serving base station of the terminal device to allocate, to the terminal device, an uplink resource used by the terminal device to send an SRS. The LMF network element may send an NRPPa message. The NRPPa message includes: Message Type, NRPPa Transaction ID, and Requested SRS Transmission Characteristics.

S202: The serving base station of the terminal device allocates, to the terminal device, an uplink resource for sending a reference signal.

S203: The serving base station of the terminal device sends reference signal configuration information and related parameter information to the LMF network element.

S204: If the resource is successfully allocated, the serving base station of the terminal device notifies the terminal device of the reference signal configuration information.

S205: The LMF network element selects a LMU 1 and a LMU 2, and sends a measurement request message to the LMU 1 and the LMU 2. The measurement request message may be an SLm message, and parameters carried in the SLm message are shown in the following Table 3:

TABLE 3

| Parameter Name | Parameter Status | Parameter Description |
| --- | --- | --- |
| UAOA Measurement Configuration | Mandatory | Indicating a network element to measure the reference signal sent by the terminal device, to obtain the UAOA |
| Angle range | Mandatory | Plane angle AOA ∈ [−180°, 180°] First plane angle AAOA ∈ [−180°, 180°] Second plane angle ZAOA ∈ [0°, 180°] |

It should be noted that the LMF selects an LMU that has an angle measurement function. Usually, the LMU may be integrated with the base station to share an antenna, and measure the UAOA by using the antenna. The LMU may also exist independently, including a physical module for measuring an angle, for example, an antenna array.

S206: The LMU 1 and the LMU 2 receive the reference signal sent by the terminal device, measure an incident angle of the reference signal, and use the incident angle of the reference signal as the UAOA obtained through measurement.

The UAOA may be obtained by measuring an incident angle of a strongest path of the reference signal, or the UAOA may be obtained by measuring an incident angle of a line-of-sight path of the reference signal. In addition, the UAOA obtained by measuring an incident angle of a second strongest path of the reference signal may be used as an alternative option.

S207: The LMU 1 and the LMU 2 send a measurement request response to the LMF network element, where the measurement request response carries a measurement result of a neighboring base station and a measurement result of the serving base station, and the LMF network element may obtain a positioning measurement parameter set by obtaining the measurement results of the serving base station and the neighboring base station. In some embodiments, the measurement request response may be an SLm message, and parameters in the SLm message are shown in the following Table 4:

TABLE 4

| Information Name | | Parameter Status | Parameter Description |
| --- | --- | --- | --- |
| UAOA Measurements (measurement result) | UAOA | Mandatory | Representing an UAOA that is on a plane and that is obtained by measuring the reference signal sent by the terminal device |
| | UAAOA UZAOA | Mandatory | AAOA represents a pitch angle obtained by measuring the reference signal sent by the terminal device; ZAOA represents an azimuth obtained by measuring the reference signal sent by the terminal device |

TABLE 4-continued

| Information Name | | Parameter Status | Parameter Description |
|---|---|---|---|
| | UL-EARFCN | Mandatory | Representing a center frequency of the uplink resource used by the terminal device to send the reference signal |
| gNB Information (base station information) | Location information | Mandatory | Indicating location coordinates and the height of the base station |
| | Antenna array information (antenna information) | Mandatory | Indicating an arrangement mode of antenna array elements of the base station and a quantity of array elements |
| | Legal direction of antenna array | Mandatory | Indicating a normal direction of a base station antenna |
| Measurement quality (measured quality value) | | Mandatory | Indicating reliability of the UAOA obtained through measurement by the base station, where the reliability is related to a historical measurement result and the RSRP/RSRQ obtained by the base station by measuring the reference signal |
| SRS Measurements (reference signal quality) | RSRP | Mandatory | Reference signal received power |
| | RSRQ | Mandatory | Reference signal received quality |
| Criticality Diagnostics | | Optional | Sent when a received message is not interpreted, is lost, or has a logic error |

S208: The LMF network element positions the terminal device.

In an implementation, the LMF network element may position the terminal device based on measurement results fed back by the first LMU and the second LMU. For example, one direction line is determined based on a first UAOA fed back by the first LMU, one direction line is determined based on a second UAOA fed back by the second LMU, and an intersection point of the two direction lines is determined as a location of the terminal device.

Figure 13:
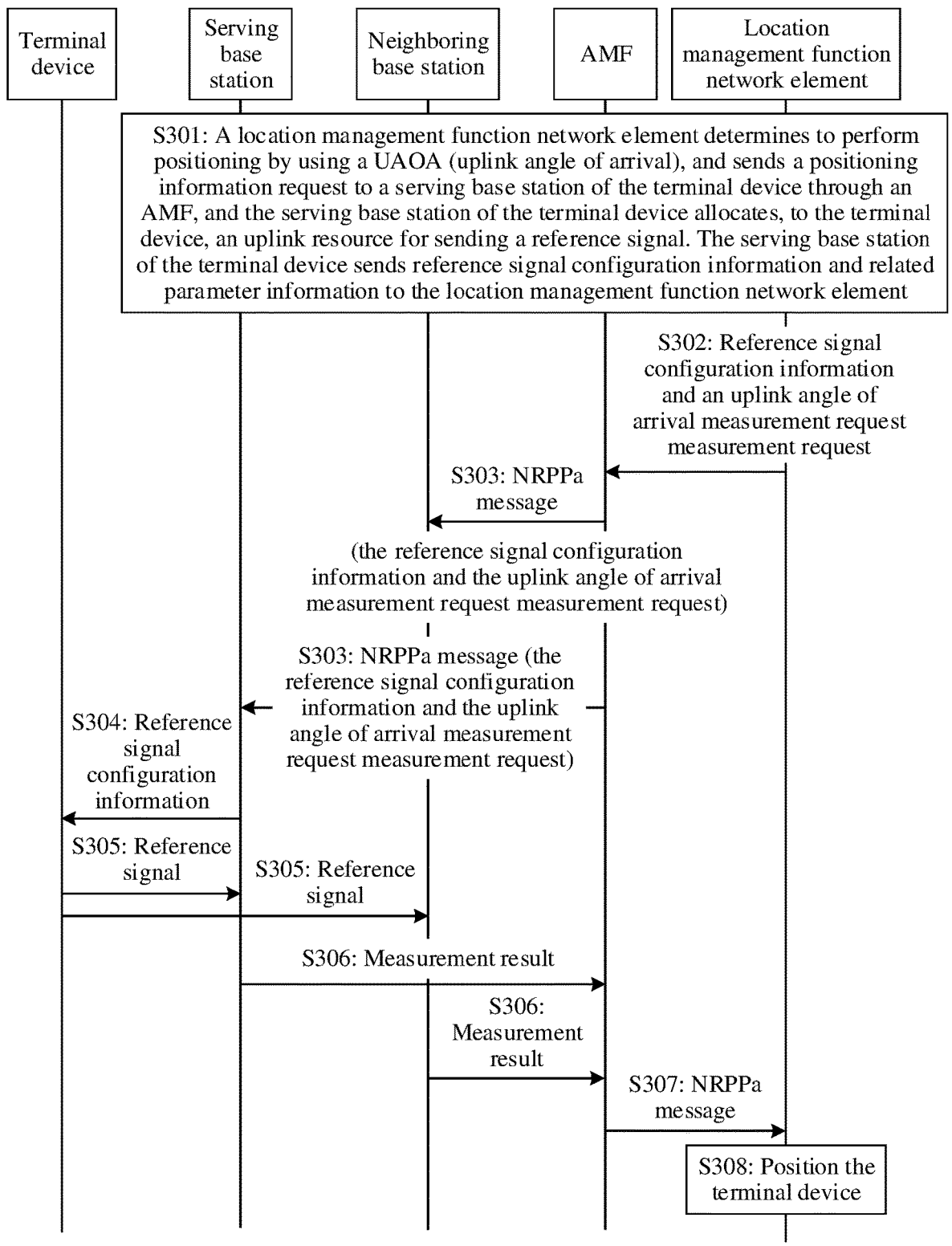
FIG. 13 is another schematic flowchart of a positioning method according to an embodiment.

In the communications system shown in FIG. 4, information needs to be forwarded between the LMF network element and the base station through an AMF. Based on this system, an embodiment further provides a positioning method. Referring to FIG. 13, a procedure in which a LMF network element indicates a base station to obtain an UAOA through measurement is as follows.

S301: A LMF network element determines to perform positioning by using a UAOA (UAOA), and sends a location information request to a serving base station of a terminal device through an AMF, and the serving base station of the terminal device allocates, to the terminal device, an uplink resource for sending a reference signal. The serving base station of the terminal device sends reference signal configuration information and related parameter information to the location management function network element.

S302: The LMF network element sends the reference signal configuration information and an UAOA measurement request to the AMF.

S303. The AMF sends the reference signal configuration information and the UAOA measurement request to the serving base station of the terminal device and a neighboring base station of the serving base station by using an NRPPa message.

The AMF may send an NRPPa message, and parameters carried in the NRPPa message are shown in Table 1.

S304: If the resource is successfully allocated, the serving base station of the terminal device sends the reference signal configuration information to the terminal device.

S305: The serving base station of the terminal device and the neighboring base station of the serving base station receive the reference signal sent by the terminal device.

S306: The serving base station of the terminal device and the neighboring base station of the serving base station return measurement results and the like to the AMF by using NRPPa messages.

Parameters carried in the NRPPa message are shown in Table 2.

S307: The AMF summarizes the measurement results in the NRPPa messages sent by the serving base station of the terminal device and the neighboring base station of the serving base station, and sends NRPPa messages to the LMF network element.

It should be noted that the NRPPa message sent by the neighboring base station carries the measurement result of the neighboring base station, and the NRPPa message sent by the serving base station carries the measurement result of the serving base station. The LMF network element may obtain a positioning measurement parameter set by obtaining the measurement results of the serving base station and the neighboring base station. The NRPPa message sent by the AMF to the location management function network element carries the measurement results of the serving base station and the neighboring base station, and the NRPPa message may include an UAOA obtained through measurement by the serving base station, an UAOA obtained through measurement by the neighboring base station, reference signal quality obtained through measurement by the serving base station, reference signal quality obtained through measurement by the neighboring base station, and the like.

S308: The LMF network element positions the terminal device.

In an implementation, the LMF network element may position the terminal device based on the measurement results that are forwarded by the AMF and that are from the serving base station and the neighboring base station. For example, one direction line is determined based on a first UAOA obtained through measurement by the serving base station, one direction line is determined based on a second UAOA obtained through measurement by the neighboring base station, and an intersection point of the two direction lines is determined as a location of the terminal device.

Figure 14:
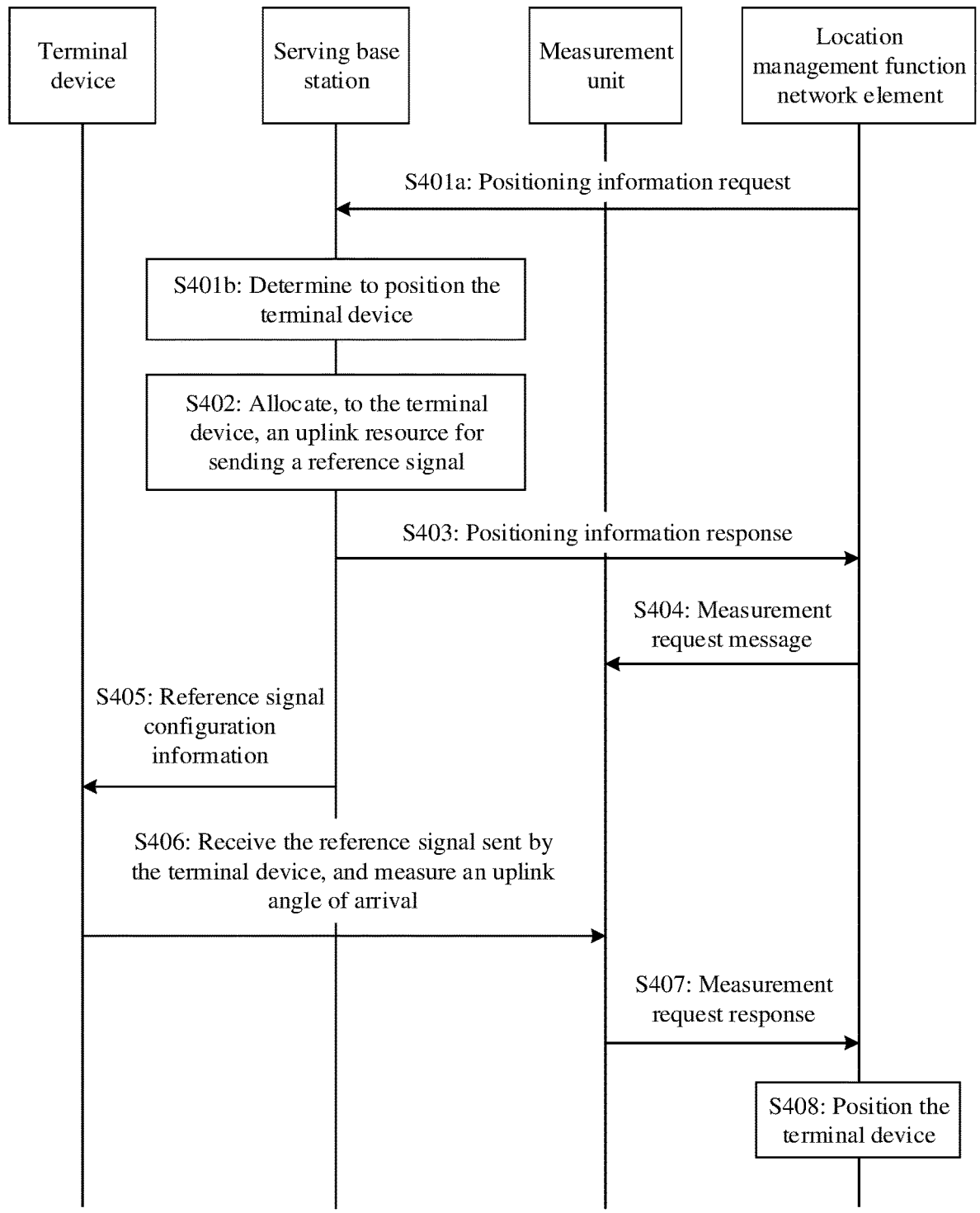
FIG. 14 is another schematic flowchart of a positioning method according to an embodiment.

Similarly, the positioning method provided in this embodiment is described by using an example in which the positioning measurement network element set includes two UAOAs. The LMF network element may indicate one network element in a positioning measurement network element set to measure two different uplink reference signals sent by the terminal device. In the communications system shown in FIG. 3, the LMF network element may position the terminal device by measuring, by using one network element, the reference signal sent by the terminal device. Referring to FIG. 14, the method includes the following steps.

S401a: A LMF network element sends a location information request to a serving base station of a terminal device, to trigger the serving base station of the terminal device to allocate, to the terminal device, an uplink resource used by the terminal device to send an SRS. The LMF network element may send an NRPPa message. The NRPPa message includes: Message Type, NRPPa Transaction ID, and Requested SRS Transmission Characteristics.

S401b: The serving base station of the terminal device determines to position the terminal device.

It should be noted that either step S401a or step S401b needs to be performed.

S402: The serving base station of the terminal device allocates, to the terminal device, an uplink resource for sending a reference signal.

It should be noted that when there is no available uplink resource, the serving base station of the terminal device allocates an empty resource to the terminal device.

S403: The serving base station of the terminal device sends a location information response to the LMF network element. The location information response may be an NRPPa message. The sent NRPPa message may include Message Types, NRPPa Transaction ID, and UL Configuration. UL Configuration represents an uplink configuration parameter. In some embodiments, the NRPPa message sent by the base station may further include Criticality Diagnostics. The parameter is sent by the base station when the base station does not interpret a message sent by the LMF network element, fails to receive a message sent by the LMF network element, or has a logic error.

When an uplink resource configuration returned by the serving base station of the terminal device to the LMF network element is empty, the LMF network element may use another positioning method.

S404: The LMF network element sends a measurement request message to a measurement network element, where the measurement request message may be an NRPPa message.

Parameters carried in the NRPPa message are shown in the foregoing Table 1. It should be noted that the base station in Table 1 needs to be understood as the measurement network element.

It should be noted that the measurement network element is a network element in the positioning measurement network element set in this embodiment, for example, a first network element in this embodiment, may be a base station, and may be the serving base station of the terminal device or a neighboring base station of the serving base station. Alternatively, the measurement network element may be an LMU selected by the LMF network element.

S405: After resource configuration succeeds, the serving base station of the terminal device sends reference signal configuration information to the terminal device.

It should be noted that the serving base station of the terminal device allocates two different uplink resources to the terminal device, that is, the first uplink resource and the second uplink resource in the embodiments.

Then, the terminal device may broadcast the reference signal by using the two different uplink resources allocated by the serving base station. For example, the terminal device sends the reference signal by using the first uplink resource, and sends the reference signal by using the second uplink resource.

S406: The measurement network element receives the two reference signals sent by the terminal device, measures incident angles of the two reference signals, and uses the incident angles as a first UAOA and a second UAOA that are obtained through measurement.

S407: The measurement network element sends a measurement request response to the LMF network element, and feeds back the first UAOA and the second UAOA.

The measurement request response carries a measurement result of the neighboring base station and a measurement result of the serving base station, and the LMF network element may obtain the positioning measurement parameter set by obtaining the measurement results of the serving base station and the neighboring base station. In some embodiments, the measurement request response may be an NRPPa message. Parameters carried in the NRPPa message are shown in Table 2. It should be noted that the base station in Table 2 needs to be understood as the measurement network element.

S408: The LMF network element positions the terminal device.

In a an implementation, the LMF network element may position the terminal device based on the two UAOAs that are obtained through measurement by the measurement network element. For example, one direction line is determined based on a first UAOA obtained by measuring the reference signal by the measurement network element, one direction line is determined based on a second UAOA obtained by measuring the reference signal by the measurement network element, and an intersection point of the two direction lines is determined as a location of the terminal device.

In the communications system shown in FIG. 4, the LMF network element may alternatively measure, by using one network element, the reference signal sent by the terminal device, to position the terminal device. When the base station is used to measure the reference signal sent by the terminal device, a message between the LMF network element and the base station needs to be forwarded through an AMF.

Figure 15:
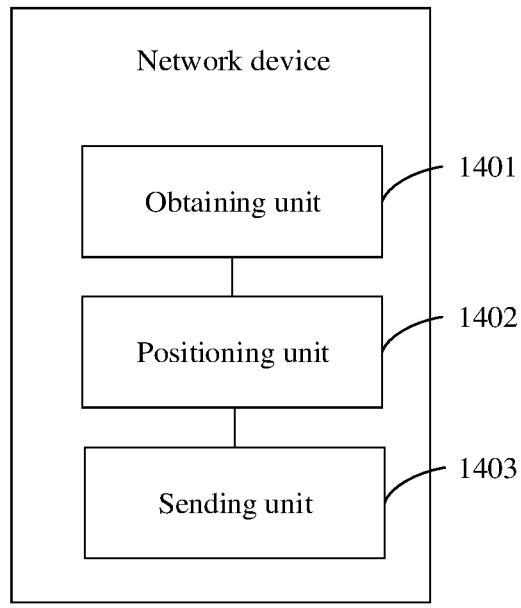
FIG. 15 is another structural block diagram of a network device according to an embodiment.

When each function module is obtained through division based on each corresponding function, an embodiment provides a network device. FIG. 15 is a possible schematic structural diagram of the network device. The network device shown in FIG. 15 may be the LMF network element in the embodiments. As shown in FIG. 15, the network device includes an obtaining unit 1401, a positioning unit 1402, and a sending unit 1403.

The obtaining unit 1401 is configured to support the network device in performing step 601, step S103, step S107, step S203, step S207, step S103, step S307, step S403, and step S407 in the foregoing embodiments, and/or another process related to the embodiments.

The positioning unit 1402 is configured to support the network device in performing step 602, step S108, step S208, step S308, and step S408 in the foregoing embodiments, and/or another process related to the embodiments.

The sending unit 1403 is configured to support the network device in performing step S104, step S201, step S205, step S302, and step S404 in the foregoing embodiments, and/or another process related to the embodiments.

It should be noted that all related content of the steps in the foregoing method embodiments may be cited in function descriptions of corresponding function modules. Details are not described again herein.

Figure 16:
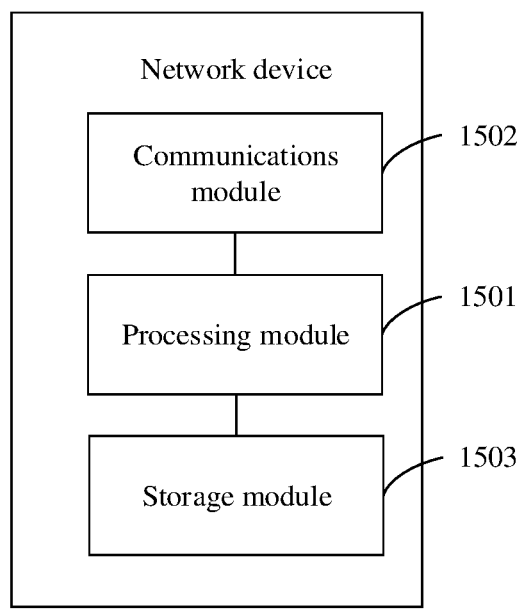
FIG. 16 is another structural block diagram of a network device according to an embodiment.

For example, when an integrated unit is used, a schematic structural diagram of a network device according to an embodiment is shown in FIG. 16. In FIG. 16, the network device includes a processing module 1501 and a communications module 1502. The processing module 1501 is configured to control and manage an action of the network device, for example, perform the step performed by the positioning unit 1402, and/or configured to perform another process related to the embodiments. The communications module 1502 is configured to perform the steps performed by the obtaining unit 1401 and the sending unit 1403, to support interaction between the network device and another device, for example, interaction between the network device and a base station or an LMU. As shown in FIG. 16, the network device may further include a storage module 1503, and the storage module 1503 is configured to store program code and data of the network device.

When the processing module 1501 is a processor, the communications module 1502 is a transceiver, and when the storage module 1503 is a memory, the network device is the network device shown in FIG. 5.

Figure 17:
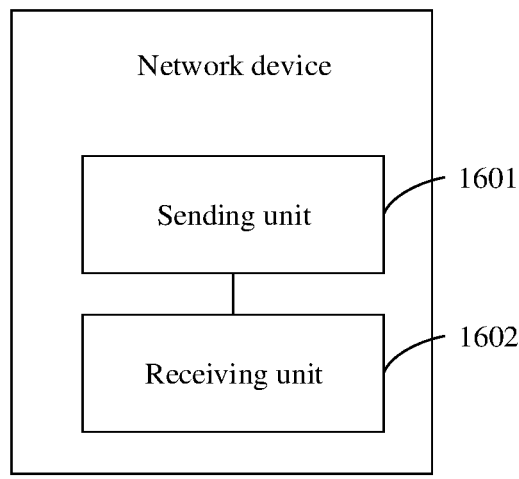
FIG. 17 is another structural block diagram of a network device according to an embodiment.

When each function module is obtained through division based on each corresponding function, an embodiment further provides a network device. FIG. 17 is a possible schematic structural diagram of the network device. The network device shown in FIG. 17 may be a network element in the positioning measurement network element set in this embodiment, and may be a base station or an LMU. As shown in FIG. 17, the network device includes a sending unit 1601 and a receiving unit 1602.

The sending unit 1601 is configured to support the network device in performing step S407 in the foregoing embodiment, and/or another process related to the embodiments.

The receiving unit 1602 is configured to support the network device in performing step S404 in the foregoing embodiment, and/or another process related to the embodiments.

It should be noted that all related content of the steps in the foregoing method embodiments may be cited in function descriptions of corresponding function modules. Details are not described again herein.

Figure 18:
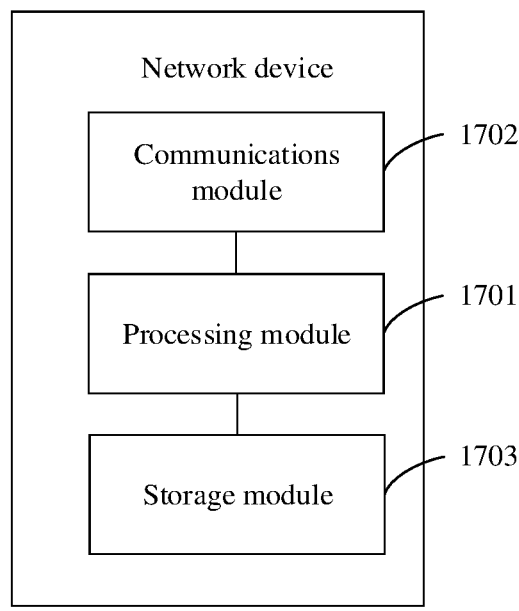
FIG. 18 is another structural block diagram of a network device according to an embodiment.

For example, when an integrated unit is used, a schematic structural diagram of a network device according to an embodiment is shown in FIG. 18. In FIG. 18, the network device includes a processing module 1701 and a communications module 1702. The processing module 1701 is configured to control and manage an action of the network device, for example, generate a measurement request response, and/or configured to perform another process related to the embodiments. The communications module 1702 is configured to perform the steps performed by the sending unit 1601 and the receiving unit 1602, to support interaction between the network device and another device, for example, interaction between the network device and a second device and a network device. As shown in FIG. 18, the network device may further include a storage module 1703, and the storage module 1703 is configured to store program code and data of the network device.

Figure 19:
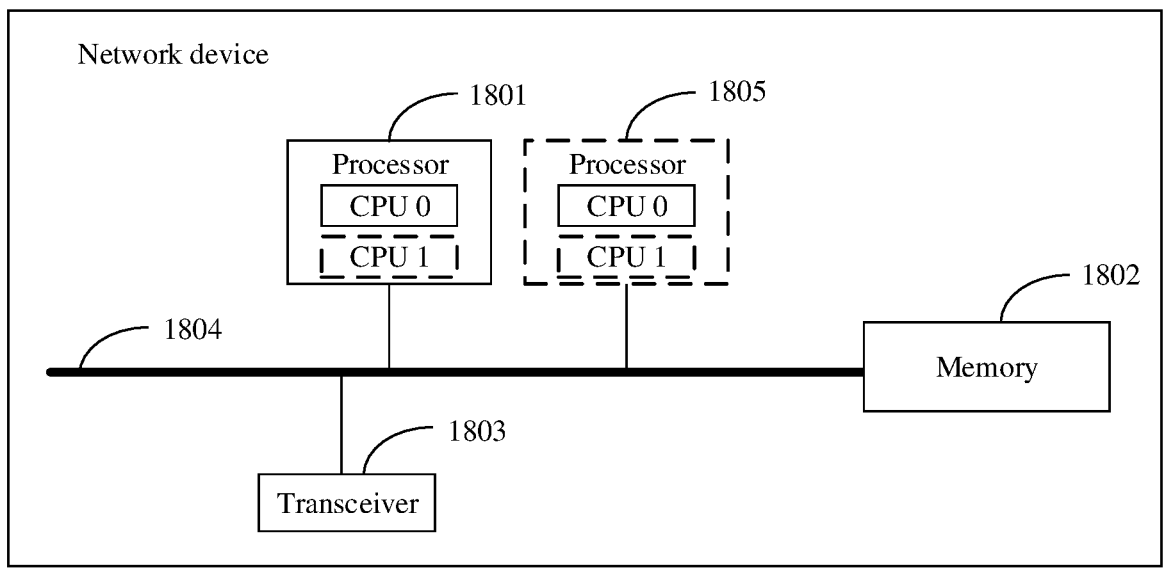
FIG. 19 is another structural block diagram of a network device according to an embodiment.

When the processing module 1701 is a processor, the communications module 1702 is a transceiver, and when the storage module 1703 is a memory, the network device is the network device shown in FIG. 19.

The following describes each component of the network device in detail with reference to FIG. 19.

The processor 1801 is a control center of the network device, and may be one processor or may be a collective name of a plurality of processing elements. For example, the processor 1801 is a CPU, or may be an ASIC, or is configured as one or more integrated circuits implementing this embodiment, for example, one or more microprocessors (DSP) or one or more field programmable gate arrays (FPGA).

The processor 1801 may run or execute a software program stored in the memory 1802, and invoke data stored in the memory 1802, to perform various functions of the network device.

In an implementation, in an embodiment, the processor 1801 may include one or more CPUs, such as a CPU 0 and a CPU 1 in FIG. 19.

In a, implementation, in an embodiment, the network device may include a plurality of processors, for example, the processor 1801 and a processor 1805 shown in FIG. 19. Each of the processors may be a single-core processor (single-CPU) or may be a multi-core processor (multi-CPU). The processor herein may refer to one or more network devices, circuits, and/or processing cores configured to process data (for example, a computer program instruction).

The memory 1802 may be a ROM or another type of static storage network device that can store static information and instructions, a random access memory RAM or another type of dynamic storage network device that can store information and instructions, or may be an EEPROM, a CD-ROM or another compact disc storage, an optical disc storage (including a compressed optical disc, a laser disc, an optical disc, a digital versatile disc, a blue-ray optical disc, and the like), or a magnetic disk storage medium or another magnetic storage network device, or any other medium that can carry or store expected program code in a form of an instruction or a data structure and that can be accessed by a computer, but is not limited thereto. The memory 1802 may exist independently and is connected to the processor 1801 through the communications bus 1804. The memory 1802 may alternatively be integrated with the processor 1801.

The memory 1802 is configured to store a software program for performing the solutions of the embodiments, and the processor 1801 controls execution of the software program.

The transceiver 1803 is configured to communicate with a second device. The transceiver 1803 may be an antenna array of the network device. The transceiver 1803 may further be configured to communicate with a communications network, such as the Ethernet, a RAN, or a WLAN. The transceiver 1803 may include a receiving unit for implementing a receiving function and a sending unit for implementing a sending function.

The communications bus 1804 may be an ISA bus, a PCI bus, an EISA bus, or the like. The bus may be classified into an address bus, a data bus, a control bus, and the like. For ease of representation, only one thick line is used to represent the bus in FIG. 19, but this does not mean that there is only one bus or only one type of bus.

A structure of the network device shown in FIG. 19 does not constitute a limitation on the network device, and the network device may include more or fewer components than those shown in the figure, or combine some components, or have different component arrangements.

The foregoing description about implementations allows a person having ordinary skill in the art to understand that, for ease and brevity of description, division of the foregoing function modules is used as an example for description. In actual application, the foregoing functions may be allocated to different modules and implemented based on a requirement. In other words, an inner structure of the database access apparatus is divided into different function modules to implement all or some of the functions described above.

In the several embodiments provided, it should be understood that the provided database access apparatus and method may be implemented in another manner. For example, the described database access apparatus embodiment is merely an example. For example, the division into modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the database access apparatuses or units may be implemented in electric, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, function units in the embodiments may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The storage medium includes any medium that can store program code, for example, a USB flash drive, a removable hard disk, a ROM, a RAM, a magnetic disk, or an optical disc.

The foregoing descriptions are merely embodiments, and are non-limiting. Any variation or replacement within the scope shall fall within the protection scope of the embodiments.

What is claimed is:

1. A method comprising:
   obtaining, by a location management function network element, a positioning measurement parameter set, wherein the positioning measurement parameter set comprises at least two uplink angles of arrival that are obtained by measuring a reference signal sent by a terminal device; and
   determining, by the location management function network element, a location of the terminal device based on the at least two uplink angles of arrival in the positioning measurement parameter set, wherein each uplink angle of arrival comprises at least one of a first plane angle or a second plane angle, the first plane angle is a plane angle on a first plane, the second plane angle is a plane angle on a second plane, and the first plane is perpendicular to the second plane.

2. The method according to claim 1, further comprising, before the obtaining step:
   sending, by the location management function network element, a measurement request message to at least two network elements in a positioning measurement network element set, to indicate the at least two network elements in the positioning measurement network element set to measure the reference signal sent by the terminal device.

3. The method according to claim 1, wherein obtaining, by the location management function network element, the positioning measurement parameter set further comprises:
   receiving, by the location management function network element, the at least two uplink angles of arrival that are obtained through measurement by at least two network elements respectively in a positioning measurement network element set.

4. The method according to claim 1, further comprising, before the sending step:
   sending, by the location management function network element, a location information request to a first network element, wherein the location information request is used to trigger the first network element to allocate an uplink transmission resource of the reference signal to the terminal device.

5. The method according to claim 1, wherein the positioning measurement parameter set further comprises reference signal quality or a measured quality value obtained by measuring the reference signal sent by the terminal device, wherein
   the measured quality value is used to indicate quality of the uplink angle of arrival.

6. A positioning method, comprising:
   receiving, by a first network element, a measurement request message sent by a location management function network element, wherein the measurement request message is used to indicate the first network element to measure a reference signal sent by a terminal device, the first network element belongs to a positioning measurement network element set; and
   sending, by the first network element, a measurement result to the location management function network element, wherein the measurement result comprises an uplink angle of arrival that are obtained by measuring a reference signal sent by the terminal device, wherein the uplink angle of arrival comprises at least one of a first plane angle or a second plane angle, the first plane angle is a plane angle on a first plane, the second plane angle is a plane angle on a second plane, and the first plane is perpendicular to the second plane.

7. The method according to claim 6, wherein the receiving, by a first network element, the measurement request message sent by the location management function network element comprises:
   receiving the measurement request message sent by an access management network element, wherein the measurement request message is sent after the access management network element receives a new radio positioning protocol annex message sent by the location management function network element, and the new radio positioning protocol annex message is used to indicate the access management network element to send the measurement request message to a network element in the positioning measurement network element set.

8. The method according to claim 6, wherein the sending, by the first network element, the positioning measurement parameter set to the location management function network element comprises:
sending, by the first network element, a new radio positioning protocol annex message to the access management network element, wherein the new radio positioning protocol annex message comprises the measurement result.

9. A network device, comprising:
a receiver, configured to obtain a positioning measurement parameter set, wherein the positioning measurement parameter set comprises at least two uplink angles of arrival that are obtained by measuring a reference signal sent by a terminal device; and
a processor, configured to determine a location of the terminal device based on the at least two uplink angles of arrival in the positioning measurement parameter set, wherein each uplink angle of arrival comprises at least one of a first plane angle or a second plane angle, the first plane angle is a plane angle on a first plane, the second plane angle is a plane angle on a second plane, and the first plane is perpendicular to the second plane.

10. The network device according to claim 9, further comprising:
a transmitter configured to send a measurement request message to at least two network elements in a positioning measurement network element set, to indicate the at least two network elements in the positioning measurement network element set to measure the reference signal sent by the terminal device.

11. The network device according to claim 9, wherein the receiver is further configured to:
receive the at least two uplink angles of arrival that are obtained through measurement by at least two network elements respectively in a positioning measurement network element set.

12. The network device according to claim 9, wherein the transmitter is further configured to:
send a location information request to a first network element, wherein the location information request is used to trigger the first network element to allocate an uplink transmission resource of the reference signal to the terminal device.

13. The network device according to claim 9, wherein the positioning measurement parameter set further comprises reference signal quality or a measured quality value obtained by measuring the reference signal sent by the terminal device, wherein the measured quality value is used to indicate quality of the uplink angle of arrival.

14. The network device according to claim 9, wherein the positioning measurement parameter set is carried in a new radio positioning protocol annex or an F1 application protocol.

15. The method according to claim 6, wherein the measurement result further comprises reference signal quality or a measured quality value obtained by measuring the reference signal sent by the terminal device and the measured quality value is used to indicate quality of the uplink angle of arrival.

16. A network device, comprising:
a receiver, configured to receive a measurement request message sent by a location management function network element, wherein the measurement request message is used to indicate the first network element to measure a reference signal sent by a terminal device, the first network element belongs to a positioning measurement network element set; and
a transmitter, configured to send a measurement result to the location management function network element, wherein the measurement result comprises an uplink angle of arrival that are obtained by measuring a reference signal sent by the terminal device, wherein the uplink angle of arrival comprises at least one of a first plane angle or a second plane angle, the first plane angle is a plane angle on a first plane, the second plane angle is a plane angle on a second plane, and the first plane is perpendicular to the second plane.

17. The network device according to claim 16, wherein the receiver is further configured to:
receive the measurement request message sent by an access management network element, wherein the measurement request message is sent after the access management network element receives a new radio positioning protocol annex message sent by the location management function network element, and the new radio positioning protocol annex message is used to indicate the access management network element to send the measurement request message to a network element in the positioning measurement network element set.

18. The network device according to claim 16, wherein the measurement result is carried in a new radio positioning protocol annex message.

19. The network device according to claim 16, wherein the measurement request message is a new radio positioning protocol annex.

20. The network device according to claim 16, wherein the measurement result further comprises reference signal quality or a measured quality value obtained by measuring the reference signal sent by the terminal device, wherein the measured quality value is used to indicate quality of the uplink angle of arrival.

* * * * *